(12) United States Patent
O'Neil et al.

(10) Patent No.: US 11,035,500 B2
(45) Date of Patent: Jun. 15, 2021

(54) BRACKET FOR POSITIONING AND PROTECTING PIPES IN CONCRETE

(71) Applicant: Reliance Worldwide Corporation, Atlanta, GA (US)

(72) Inventors: Virgil O'Neil, Atlanta, GA (US); Larry D. Brown, Atlanta, GA (US)

(73) Assignee: RELIANCE WORLDWIDE CORPORATION, Atlanta, GA (US)

( * ) Notice: Subject to any disclaimer, the term of this patent is extended or adjusted under 35 U.S.C. 154(b) by 0 days.

(21) Appl. No.: 15/895,958

(22) Filed: Feb. 13, 2018

(65) Prior Publication Data

US 2018/0231146 A1 Aug. 16, 2018

Related U.S. Application Data

(60) Provisional application No. 62/458,924, filed on Feb. 14, 2017.

(51) Int. Cl.
*F16L 3/12* (2006.01)
*F16L 3/00* (2006.01)
(Continued)

(52) U.S. Cl.
CPC .............. *F16L 3/1226* (2013.01); *E04B 1/16* (2013.01); *E04G 15/00* (2013.01); *F16L 3/003* (2013.01);
(Continued)

(58) Field of Classification Search
CPC ....... F16L 3/1226; F16L 33/02; F16L 57/005; F16L 3/003; E04G 15/00; E04B 1/16
See application file for complete search history.

(56) References Cited

U.S. PATENT DOCUMENTS

| 1,632,206 A | * | 6/1927 | Tolman, Jr. | ................ F23J 1/00 |
| | | | | 285/16 |
| 2,328,315 A | | 8/1943 | Warren | |

(Continued)

FOREIGN PATENT DOCUMENTS

| EP | 1953439 A2 * | 8/2008 | ............ F16L 3/1226 |
| EP | 2189695 A1 * | 5/2010 | ............ F16L 3/1226 |

(Continued)

OTHER PUBLICATIONS

International Search Report for Bracket for Positioning and Protecting Pipes in Concrete, International App. No. PCT/US2018/018213, Filed Feb. 14, 2018 to Reliance Worldwide Corporation.

*Primary Examiner* — Basil S Katcheves
*Assistant Examiner* — Omar F Hijaz
(74) *Attorney, Agent, or Firm* — Stetina Brunda Garred & Brucker

(57) ABSTRACT

A bracket holds a rigid or flexible tube during the pouring of a concrete slab. The bracket has a base and a housing connected to the base. The tube curves around a first tube support on the housing before passing through an opening in the bottom of the housing. The tube and any members inside the tube are cut off so they end inside the housing and are then covered by a housing cap. The base is fastened to a form for the concrete slab. The height of the housing relative to the base is adjusted to place the cap at the planned surface of the concrete slab. After the concrete slab is formed the cap is removed and the cut members inside the housing are connected to other members or devices.

58 Claims, 19 Drawing Sheets

(51) Int. Cl.
*E04B 1/16* (2006.01)
*F16L 57/00* (2006.01)
*F16L 33/02* (2006.01)
*E04G 15/00* (2006.01)
*F16L 3/10* (2006.01)

(52) U.S. Cl.
CPC ............ *F16L 33/02* (2013.01); *F16L 57/005* (2013.01); *F16L 3/1075* (2013.01)

(56) References Cited

U.S. PATENT DOCUMENTS

| | | | | |
|---|---|---|---|---|
| 2,440,745 | A | * | 5/1948 | Hauck .................... B05B 15/625 248/81 |
| 3,643,267 | A | | 2/1972 | Winter |
| 4,433,821 | A | * | 2/1984 | Bolding ................ F16L 3/1226 248/65 |
| 4,879,771 | A | * | 11/1989 | Piskula ...................... E03F 5/02 4/256.1 |
| 6,249,975 | B1 | | 6/2001 | Lin |
| 7,527,225 | B1 | * | 5/2009 | Schulz .................. F16L 3/1226 248/56 |
| 7,635,009 | B1 | * | 12/2009 | Carew ....................... F16L 3/22 138/110 |
| 7,735,512 | B1 | * | 6/2010 | Ismert .................. E03F 5/0407 137/362 |
| D720,836 | S | * | 1/2015 | Moe ............................. D23/260 |

FOREIGN PATENT DOCUMENTS

| | | | |
|---|---|---|---|
| JP | 3278583 | | 5/1998 |
| JP | 2017172805 | A * | 9/2017 |

\* cited by examiner

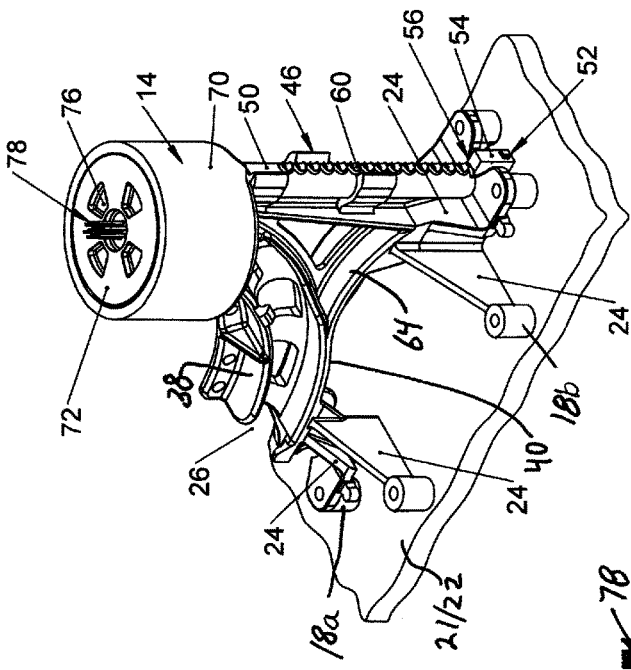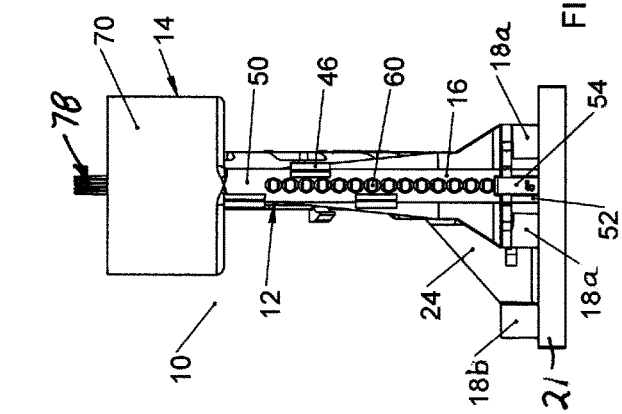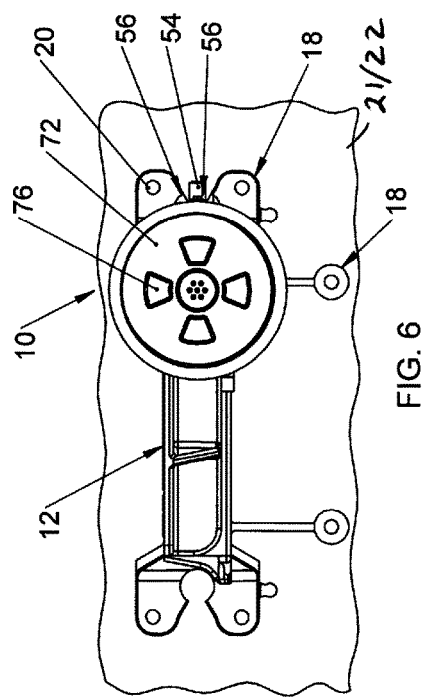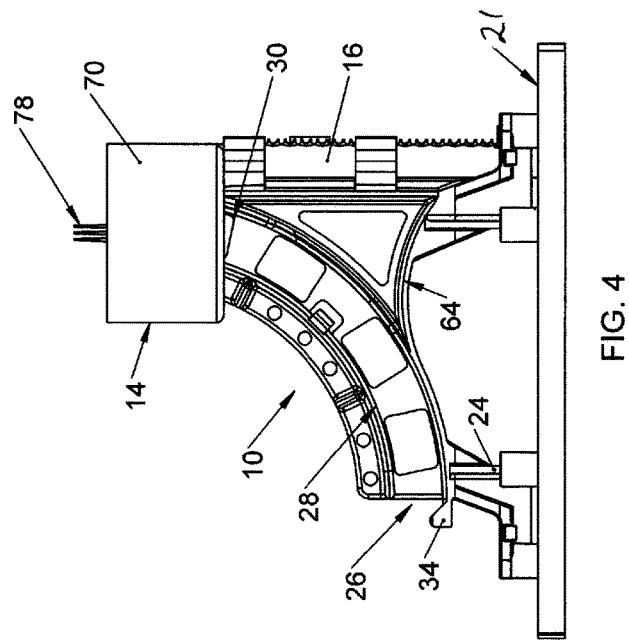

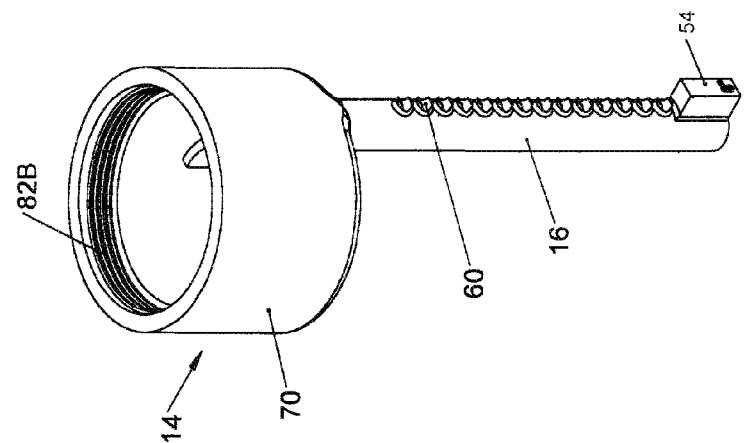
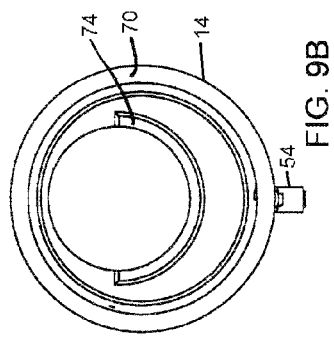
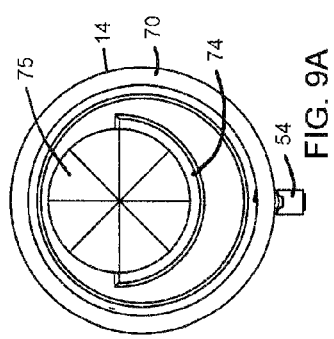
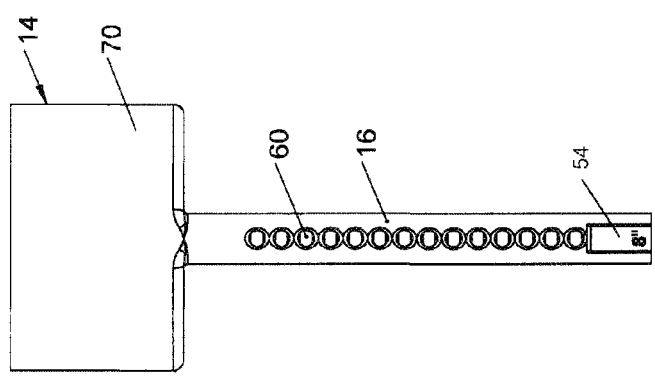

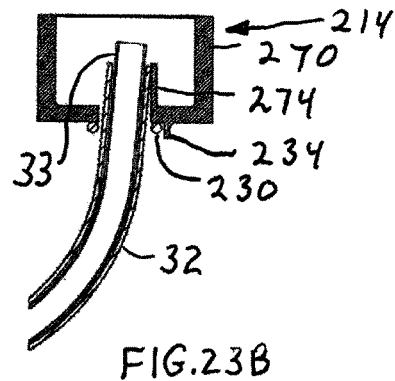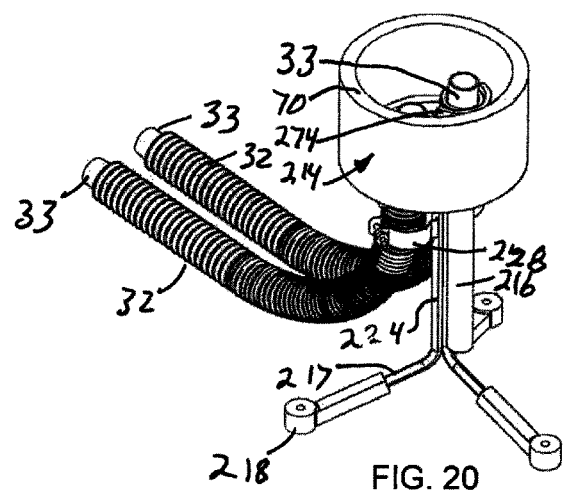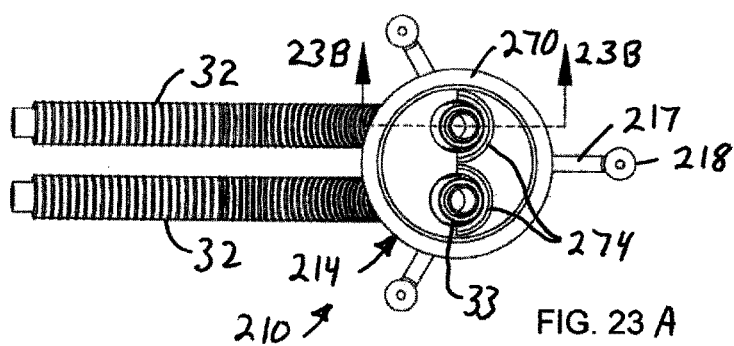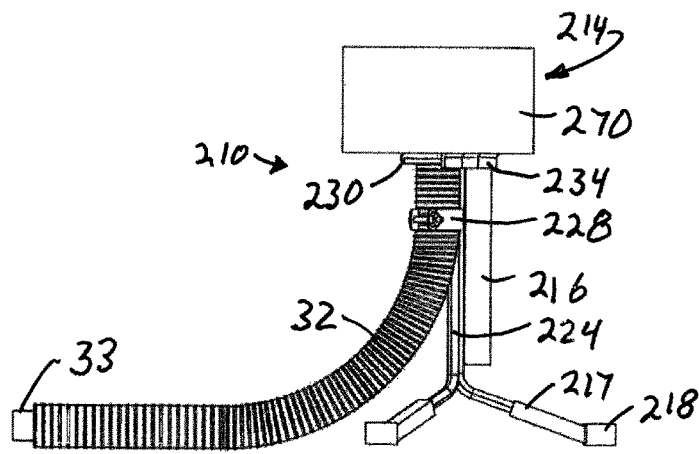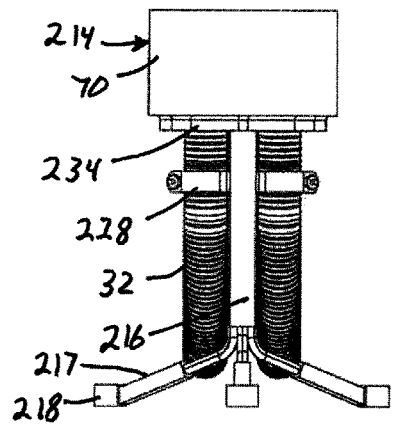

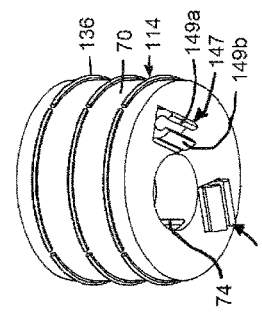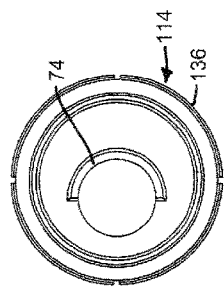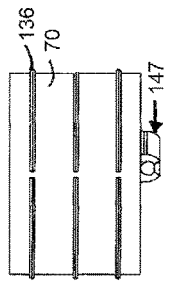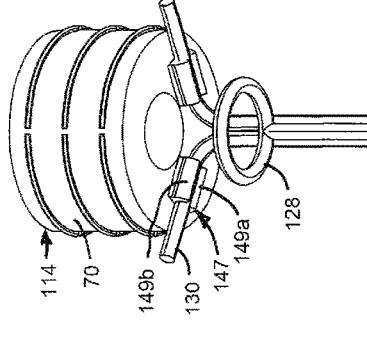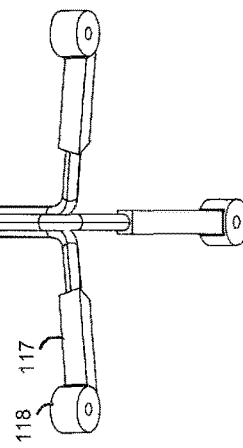

BRACKET FOR POSITIONING AND PROTECTING PIPES IN CONCRETE

CROSS-REFERENCE TO RELATED APPLICATIONS

The application claims the benefit under 35 U.S.C. § 119(e) to Provisional Patent Application No. 62/458,924 filed Feb. 14, 2017, the entire contents of which are incorporated herein by reference.

BACKGROUND

Various tube forms such as pipes, wires or conduits are embedded in concrete floors during construction. The tubes may be either flexible or rigid, and may themselves contain other elongated members such as wires or pipes. The embedded tubes are typically held by brackets that curve or bend the tubes from a generally horizontal orientation to a vertical orientation, or if rigid, sustain them in position, so the end of the tube extends several inches above the surface of the concrete that is poured over the bracket and tube. Unfortunately, after the concrete hardens, the tube or its contents extending out of the concrete surface are often damaged. The damage can arise during finishing of the concrete, especially by troweling machines, or when workers step on the tube, when wheels roll over the tube or when construction equipment or supplies hit or are placed on the tube. The tube is often a conduit containing various tubes, wires or other elongated members (i.e., conduit contents) that are also damaged along with the conduit by the above actions.

The damaged tube or tube contents inhibit connection to other members above the concrete surface for their intended use. For example, a first embedded tube may itself contain a second tube for carrying water which is typically joined to a tubular coupling or connector by mechanically spreading the coupling or connector diameter and inserting an end of the second tube, and where the coupling or connector is subsequently used to form a suitable connection to join it to an adjacent tubular member. Because of damage to the first or second tubes, however, establishing a proper connection with the adjacent tubular member may require removing part of the concrete surface around the first and second tubes in order to access undamaged portions of the tubes that were formerly embedded within the removed concrete. The cost and disruption of jack-hammering away enough concrete to establish a good connection is undesirable and may crack or otherwise weaken the poured floor—especially if too much concrete is removed either intentionally or accidentally. There is thus a need for a method and apparatus to help avoid or reduce damage to the ends of a tube and its contents that are embedded in a concrete slab and to make it easier and more reliable to connect to the tube or its contents that pass through such concrete slabs.

BRIEF SUMMARY

A bracket is provided that holds a flexible or rigid tube, and in some cases tube contents, during the pouring of a concrete slab. The bracket has a base and a housing connected to the base. The tube curves around or is supported by at least one tube support on the base before passing through an opening in the bottom of the housing. The tube and the members inside the tube, if any, are cut off so they end inside the housing and are then covered by a housing cap. The base is fastened to a form for the concrete slab. The height of the housing relative to the base is adjusted to place the cap at or slightly below the planned finished surface of the concrete slab. After the concrete slab is poured and hardens around the bracket, housing and tube, the cap is removed and one or more cut members inside the housing are connected to other members. The housing is large enough to allow access to connect the various elongated members inside the conduit but small enough that it does not impermissibly weaken the concrete surface at the location of the housing.

There is thus provided a bracket for holding at least one rigid or flexible tube having a cross-sectional diameter D while being embedded in a concrete slab having a planned thickness T. The bracket may include a base having a height and a housing connected to the base. The housing may have an opening in a bottom of the housing large enough to allow the at least one tube to enter the housing through the opening in the bottom of the housing and small enough so the housing does not fill with concrete during use. The bracket may have a first tube support connected to the base and offset a distance below the opening in the bottom of the housing and located relative to the opening in the bottom of the housing so the tube bends around the first conduit support to pass through the opening in the bottom of the housing. A removable cap covers a top of the housing to enclose an interior space inside the housing. The interior space preferably has an interior height of about 0.7 to 3 inches. The housing, base and cap when assembled for use have a height the same as or slightly less than the planned thickness T of the concrete slab.

In further variations, the bracket may include a second tube support connected to the base and offset a distance below the first tube support to further define a radius of curvature of the tube during use. The first and second tube supports may be offset a different lateral distance from a vertical axis through the opening in the bottom of the housing. The second support may include a concave curved surface when viewed from a housing side of the bracket. The first and second supports may each include a loop forming an opening larger in diameter than D. The base may include a wire frame with three legs, some of which may form the first and second supports, and some of which may form laterally extending arms on which the housing is supported or to which the housing is removably connected.

In still further variations, the first tube support may include two tube supports adjacent each other in the same plane and parallel to a top of the housing. Each tube support may be configured to at least partially encircle a different tube connected to the base. The opening in the bottom of the housing may be configured so both tubes can enter the opening in the bottom of the housing. The first tube support may include a concave curved surface when viewed from a housing side of the bracket. The first support may comprise a curved surface extending through an arc of about 90°. The first support may alternatively comprise a loop forming an opening larger in diameter than D. The base may comprise a wire frame with three legs.

Additional variations may include a housing that is removably connected to the base. The housing may be removably connected to the base by resilient clips on the housing releasably engaging mating parts of the base, or if the base is formed of wire members the housing may have clips that snap onto laterally extending portions of those wire members. Preferably though, the housing has an elongated connector releasably connected to the base to adjustably position the housing relative to a height of the base. Further, the opening in the bottom of the housing may be at least partially covered by flexible material extending across a portion of the opening in the bottom of the housing.

There is also advantageously provided a bracket for embedding a tube in a concrete slab that has an exterior surface when finished having a base, a housing and a removable housing cap. The base may have a bottom with at least one fastener opening large enough to allow a fastener to pass while inhibiting a head of the fastener from passing through the fastener opening. The base has a top opposite the bottom and a tube support having at least one of an inlet end by the bottom of the base and an outlet end by a top of the base. The tube support may have a further intermediary support so a tube abutting the at least one inlet and outlet end and abutting the intermediate support can be supported through an angle of about 90°.

The housing may have a sidewall, a top with a top opening therein and a bottom with a bottom opening therein where the bottom opening is larger than a cross-sectional diameter of the tube. The removable housing cap is configured to cover the top opening of the housing. The cap may have a top surface and an opposing bottom surface. The housing and cap preferably enclose a volume between the bottom surface of the cap and the bottom of the housing with a height of about 0.7 inches to about 3 inches. An elongated connector preferably extends between and is releasably connected to at least one of the base and the housing.

In further variations, first and second mating surfaces on the elongated connector engage corresponding third and fourth surfaces on the base to restrain rotation of the elongated connector relative to the base. The elongated connector may have a plurality of weakened sections at which the elongated connector may be broken or cut to adjust the length of the elongated connector, and the surface of the elongated connector may further be marked with numbered indicia or other indications for the adjusted length. The tube support may extend from the inlet end to the outlet end and the intermediate support may be curved about at least one axis and is preferably curved about two axes. The tube support preferably extends from the inlet end to the outlet end and the intermediate support is preferably curved to encircle at least a portion of a cross-sectional diameter of the tube during use. The opening in the bottom of the housing is preferably smaller in area than the opening in the top of the housing. The cap preferably threadingly engages the housing. The housing optionally may have resilient clips that releasably engage an outer surface of the base to releasably engage the housing to the base. The inlet end is preferably horizontal or downwardly inclined, while the outlet end is vertical. The bracket may have a base with three feet spaced apart from each other, preferably with each foot having a fastener opening and more preferably with a wire formed base in which the legs are separate wires wound together to form a vertical body with various ones of the wires extending laterally to form support arms for the housing and supports curving the tube toward the housing. One or more of the supports, and especially the intermediate and/or top end supports, may advantageously comprise wire loops formed by bending one of the legs laterally, or the supports may comprise adjustable clamps connected to the base. The housing preferably has a sidewall with no sharp corners and more preferably has a sidewall which is generally cylindrical with an open top and an opening in a bottom wall of the cylinder. The cap advantageously has at least one whisker extending outward at least about an inch from the top surface of the cap to help locate the cap in the exterior surface of the concrete.

There is further provided an alternative embodiment of a bracket for embedding a flexible tube in a concrete slab that has an exterior surface when finished in which the bracket includes a base and a housing with a cap. The base may have at least three feet spaced apart from each other with a bottom of each foot in substantially the same plane and with each foot preferably, but optionally, having either a fastener or having an opening for passage of a fastener so the base can be fastened to a concrete pouring form or to a plate. The base has at least one and preferably at least two tube supports connected to the base with each tube support offset a vertical distance and horizontal distance from each other when the feet are horizontal. The housing may be connected to the base, preferably removably. The housing may have a sidewall and a generally horizontal top with a top opening therein located above the base. The housing preferably has a bottom side with an opening therein which is large enough to allow the conduit to pass through the bottom opening while also being small enough to deter concrete from entering and filling the inside of the housing. A removable cap covers the top opening of the housing. The cap has a top surface and an opposing bottom surface. The vertical distance between the bottom of the cap and the bottom of the housing is large enough to allow a coupler to be installed by a coupling tool on an end of a tube located inside the housing and passing through the conduit, with the inside space of the housing not exceeding a few inches in height and width, and preferably about 0.7 to about 3 inches in height and the same or slightly more in the lateral direction or diameter.

In further variations of this alternative embodiment, the bracket may have an elongated connector with a bottom end releasably connected to the base and a top end connected to the housing. The elongated connector may have first and second mating surfaces located to engage corresponding third and fourth surfaces on the base in order to restrain rotation of the elongated connector relative to the base so the opening in the bottom of the housing cooperates with the tube supports to guide and retain the tube through a desired curvature. The at least one tube supports may include an intermediate support that forms a concave curved surface when viewed from a housing side of the bracket. The at least two tube supports may also comprise an inlet end closer to the plane in which the feet are located, an outlet end closer to the bottom opening of the housing, and an intermediate support located between the inlet and outlet ends and located on the foot side of a line extending between the inlet and outlet ends. Advantageously, the intermediate support is curved. The tube supports preferably comprise a curved surface extending through an arc of about 90°. The tube support is further preferably curved to encircle at least a portion of a cross-sectional diameter of the tube during use. Alternatively, the one or more of the tube supports may comprise at least one adjustable clamp.

There is further provided a method of supporting a tube during the forming of a concrete slab poured on a forming surface, using a bracket having a base and a housing with a cap enclosing a top opening of the housing to hold the tube at a planned surface of the concrete slab. The base may be configured to curve the tube toward a bottom of the housing. The method includes the step of passing the tube through or adjacent to at least one support on the base and through an opening in the bottom of the housing. The method may include cutting an end of the tube and any elongated members passing through the tube to a form a cut end or ends and putting the cap on the housing and enclosing the cut end or ends inside the housing in a space having a height of about 0.7 to about 3 inches high. The method includes fastening the base to the forming surface, wherein a height of the base, housing and cap are at or slightly below the planned surface of the concrete slab.

In further variations the method further includes pouring the concrete slab to entrain the bracket and tube and finishing the concrete surface. The method may include removing the cap from the housing and connecting a coupler to the cut end of at least one of the elongated members passing through the tube. The method may further include adjusting a height of the housing relative to the base so a height of the base, housing and cap place the cap at the planned concrete surface or slightly below the planned concrete surface before the concrete slab is formed. In some variations, the vertical height of the housing is not vertically adjustable relative to the base before the concrete slab is formed although the housing is removable from the base. In other variations, the vertical height of the housing is adjustable relative to the base before concrete is poured.

BRIEF DESCRIPTION OF THE DRAWINGS

The above, and other features and advantages of the present invention are further described in the following drawings and description in which like numbers refer to like parts throughout, and in which:

FIG. 3B a perspective view of the base of FIG. 3A with a housing connected to it to form the bracket of FIG. 1, with the bracket on either a plate or a concrete form;

FIG. 4 is a side view of the bracket of FIG. 3B on a plate;

FIG. 5 is a right side view of the bracket of FIG. 4 and an end view of the bracket of FIG. 3B;

FIG. 6 is a top view of the bracket of FIG. 4;

FIG. 7 is a perspective view of a housing and connector;

FIG. 8 is a front view of the housing and connector of FIG. 7;

FIG. 9A is a top view of the housing and connector of FIG. 8;

FIG. 9B is a top view of an alternate embodiment of the housing and connector of FIG. 8;

FIG. 20 is a perspective view of a further embodiment of a bracket and two tubes;

FIG. 21. is a side view of the bracket and tubes of FIG. 20;

FIG. 22 is a right side view of the bracket and tubes of FIG. 21;

FIG. 23A is a top view of the bracket and tubes of FIG. 21;

FIG. 23B is a partial sectional view taken along section 23B-23B of FIG. 23A;

FIG. 33A is a lower perspective view looking up, showing the base of FIG. 13-16 releasably connected to a housing using a different connector;

FIG. 33B is a lower perspective view of the housing of FIG. 33A;

FIG. 33C is a side view of the housing of FIGS. 33A and 33B;

FIG. 33D is a top view of the housing of FIG. 33C;

FIG. 33E is a bottom view of the housing of FIG. 33C; and

DETAILED DESCRIPTION

Figure 1:
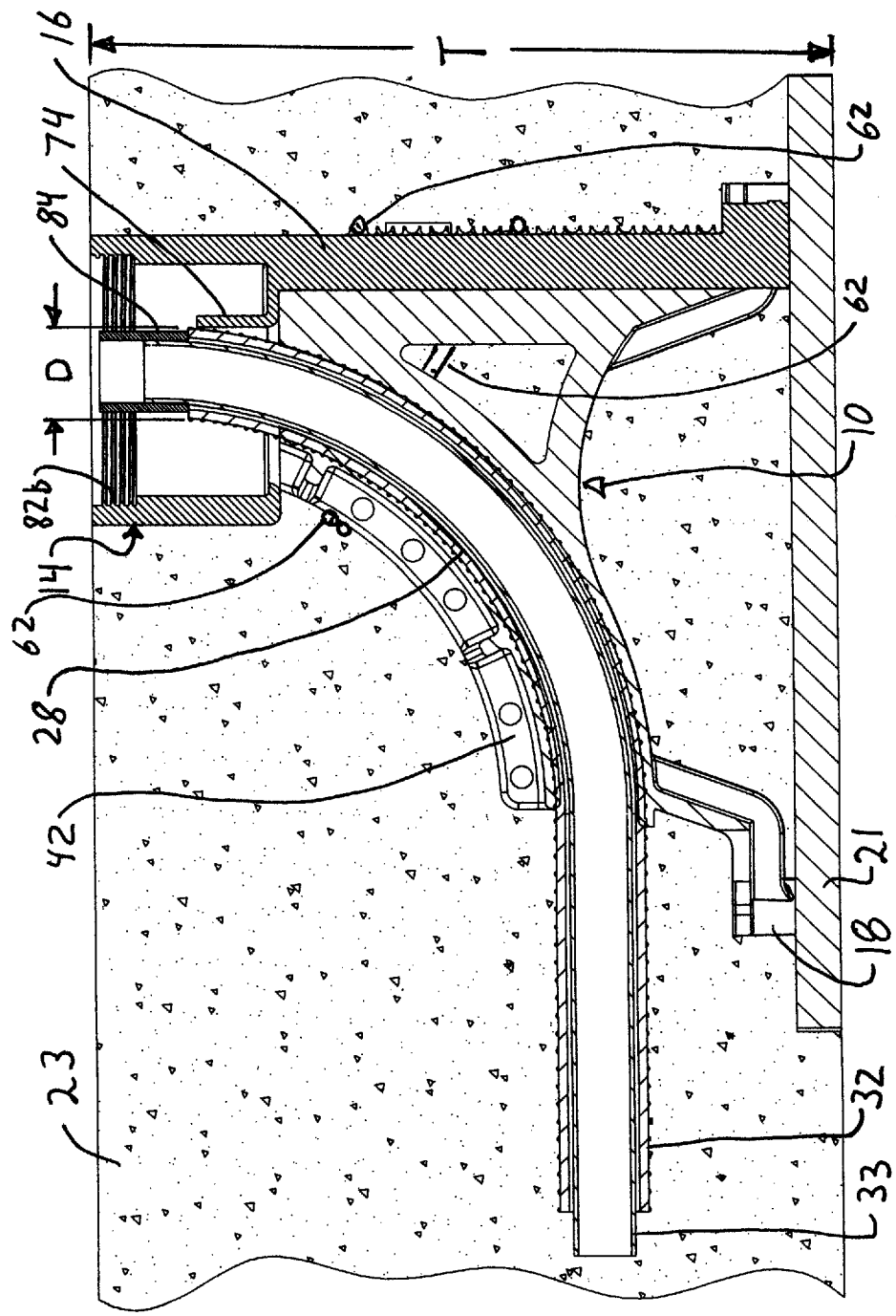
FIG. 1 is a sectional view of the bracket of FIG. 3A and tube entrained in concrete.

A list of part numbers and corresponding part names used herein is provided as follows: 10—bracket; 12—base; 14—housing; 16—connector; 18—foot; 20—fastener opening; 21—plate; 22—form for concrete; 23—concrete slab; 24—support flanges; 26—inlet end; 28—intermediate support; 30—outlet end; 32—conduit; 33—inner elongated member; 34—holding tab; 38—inner curved surface; 40—outer curved surface; 42—stiffening rib; 46—resilient arms; 48—axis; 52—keying device; 54—projection; 56—recess; 58—weakened section; 59—printed indicia; 60—recesses for wire; 62—flexible elongated member; 64—strut; 70—housing sidewall; 72—cap; 74—bottom flange of housing; 75—tabs; 76—wrenching recesses in cap; 78—whiskers; 80—central recess; 82*a*, 82*b*—threads; 84—coupling for tube 33; 112—base; 114—housing; 116—connector; 117—legs; 118—foot; 120—fastener opening; 124—body; 126—upper mounting arms; 128—intermediate conduit support; 132—resilient arms on connector; 134—positioning stops; 136—ribs on housing; 147—connector; 149*a,b*—retaining arms on connector 147; 158—narrowed section; 159—printed indicia; 212—base; 214—housing; 216—connector; 217—legs; 218—feet; 220—hole for fastener; 224—body; 228—intermediate support; 228—adjustable connector; 230—upper conduit supports; 234—positioning stops; 274—flange; 280—rigid conduit support; 284—coupling.

Referring to FIGS. 1-12, a bracket 10 has a base 12 and a housing 14 coupled together by connector 16. The base 12 may have one or more mounting feet 18, and is shown as having six feet 18. Each mounting foot preferably, but optionally, has a fastener opening 20 large enough to allow a fastener, such as a nail or screw, to pass through the fastener opening while inhibiting a head of the fastener from passing through the opening. Thus, a mounting foot 18 may be fastened to a plate 21 (FIG. 1) that is preferably large enough to allow the bracket 10 to stably support itself in a vertical orientation, or the bracket may be fastened to larger forms 22 (FIGS. 6, 13) used to create a large surface or entire surface of a concrete slab 23 when concrete is poured onto or against the plate 21 or form 22. Forms 22 typically comprise plywood sheets, but could comprise a ground surface on which concrete forms are placed. Typically, the plate 21 rests on the support 22 when the plate is used. When the plate 21 is used, it may be considered as part of the base 12 (and considered a part of the base in the other embodiments herein). As used in the drawings, the part number 21/22 may be used to refer to either a smaller mounting form 21 or the larger support 22.

In the depicted embodiment two mounting feet 18A extend outward from each of the two opposing ends of the base 12. Two mounting feet 18B are also located laterally to one side of the base 12 and are connected to the base by support flanges 24 that extend vertically and laterally from the axis between feet 18A on opposing ends of the base. The mounting feet 18 are at a bottom of the base, and include mounting feet 18A and 18B. As used herein, the relative directional terms top and bottom, above and below, upper and lower, refer to the relative position along the vertical axis relative to FIG. 1, where the concrete slab 23 is on the ground or on a surface parallel to the ground and to the horizontal axis. Depending on the orientation of the bracket 10 and form 22, the actual location and orientation of the parts described herein may change.

The base 12 preferably includes at least one support for a curved tube, and preferably includes at least two supports and more preferably includes three supports for the curved tube. The base 12 may have at least one of an inlet end 26 by the bottom of the base and an outlet end 30 at a top of the base, and may further have an intermediate conduit support 28 between the inlet and outlet ends 26, 30. The inlet and outlet ends 28, 30 define not only a location on the base 12 but may preferably define physical supports that contact and guide the conduit 32. Any two of the three parts of the support, 26, 28, 30 may be omitted but preferable two of the three parts are used and more preferably all three parts are used.

The tube 32 may comprise any rigid or flexible tubing suitable for its intended use. As used herein, flexible means the ability to be manually and repeatedly flexed numerous times through a substantial arc of 30 to 90 degrees without breaking, whereas a rigid tube is substantially capable of maintaining its shape without external support and in spite of a degree of force acting to alter its shape. The tube may be bendable so as to allow manually bending. Smurf tubing, or corrugated plastic conduit, is commonly used for the flexible tube 32. The tube 32 may contain other tubes or members inside the tube. For ease of reference the tube or conduit 32 is shown as containing a single inner elongated member 33, which represents one or more of a flexible tubing suitable for carrying drinking water, or gases, or electrical wires or computer cables, or optical fibers, or other flexible and elongated members now used or developed in the future. The tube 32 and inner elongated member 33 preferably both end inside of the housing 14.

The tube support may comprise a single, continuous cylindrical tubular support extending through an arc of about 90°, preferably of uniform cylindrical diameter, and sized so that the tube 32 may pass through the inside of the curved, tubular support. The inlet end 26 of the support is preferably horizontal or downwardly inclined while the outlet end 30 is generally vertically inclined, with intermediate support 28 in between those ends and located on or adjacent to the desired curve of the tube 32. The inlet end 26 is preferably near the bottom of the concrete slab but the location and orientation will vary depending on the desired location of the tube 32 entering the bracket 10. FIG. 1 shows the tube 32 parallel to but internal to the bottom of the concrete slab 23. The outlet end 30 is preferably near the top of the concrete slab 23 and at or near the bottom of the housing 14. The inlet end 26 and outlet end 30 are preferably parts of the tube support and serve to support and maintain the tube 32 through its desired curvature during installation of the bracket 10 and pouring of the concrete to entrain the bracket and tube in the slab of concrete. When viewed from the housing side of the bracket, the tube support preferably comprises a concave curve as seen in FIGS. 1-3 and 4, with the upper end of the support 30 higher than the lower end 26 and curved in between at intermediate support 28.

Preferably though, and as shown in FIG. 1, the tube support forms only a portion of a cylindrical tube extending along an angle of about 90° and having a slot in the lateral side through which slot the tube 32 may be inserted laterally from the inlet end 26 to the outlet end 30. A holding tab 34 may be located along the slot through which the tube is inserted laterally into the base 12, with the tab 34 preferably at the inlet end 26 and also at the outlet end 30. The holding tab 34 may extend into the open side slot enough so that a flexible tube 32 may be bent over the holding tabs 34 yet fit into the tube support with the holding tabs 34 restraining the tube from sliding laterally out of the curved tube support. The tube support may thus take the form of a continuous cylindrical tube with a slot opening laterally to one side. But preferably the tube support has a plurality of access openings 36 in the sidewalls of the general tubular shape shown in the drawings. The access openings 36 are preferably about 1.5 times the largest dimension of the aggregate used in the concrete to help ensure entrainment of the bracket in the concrete slab 23.

The bracket 10 is preferably pre-formed to support tube 32 through a desired angle or arc of curvature or bend, with the housing 14 located above the pre-formed base 12. The tube support of the base 12, including the support 28 or 30 may extend into the interior volume of the housing but that is not preferred because that limits the space usable to form connections, but those parts of the base may extend at least part way into an opening in the bottom of the housing preferably bounded by or partially formed by bottom flange 74 that extends into the housing and preferably extends along an axis parallel to the sidewall 70. The housing preferably does not have a completely open bottom coextensive with the sidewall 70, and instead has a bottom surface with an opening in it, but either may be referred to as an opening in the bottom of the housing. The opening in the bottom of the housing is small enough so the housing does not fill with concrete during use. As the top of the housing is generally parallel with the concrete and concrete is poured from the top down and then spreads sideways to form the slab, the concrete is not directly forced into the opening in the bottom of the housing.

Preferably the top of the base 12 and outlet end 30 stop below the bottom of the housing 14, and less preferably stop in the bottom opening formed by the thickness of the bottom of the housing in which the bottom opening is formed and at least partially encircled by bottom flange 74.

While the connector 16 allows positioning the housing 14 above the base 12, problems arise if the housing has to be lowered so that part of the base 12 and supports 26, 28, 30 extend into the interior of the housing because extending the base into the housing interferes with access to the tube 32 inside the housing as needed to make connections to tube 32 or to the other tubes, conduit or to wires, cables, etc. carried within the tube 32 and represented generally by inner elongated member 33 in the drawings. The amount by which the base 12 extends into the interior of the housing 14 preferably varies from no intrusion (FIG. 1), to partial intrusion.

Referring to FIGS. 1-5, the top of the housing 14 is covered by cap 72. The cap 72 may be fastened to the inside of the housing 14 so the cap does not necessarily increase the height of the housing and may have the top surface of the cap below the top of the housing. Alternatively, and less desirably, the cap may be fastened to the outside of the housing and thus increase the effective height of the housing, or even if fastened to the inside of the housing the cap may extend above and increase the height of the housing.

In one preferred embodiment, the combined height of the base 12, optional plate 21 (when present), housing 14 and cap 72 are selected so the bracket 10 places the top of the housing or cap at the surface of the finished concrete slab 23. Locating the top of the housing or cap within about ⅛ inch of the concrete surface is believed suitable and the bracket 10, optional plate 21 and cap 72 are selected or formed to achieve that desired location of the top of the housing or cap. Thus, the bracket 10, housing 14, cap 72 and optional plate 21 are selected to have a height the same as or slightly less than (i.e., about ⅛ inch less) the desired thickness T of slab 23. It is undesirable to have the top of the housing 14 or cap 72 extend above the surface more than a very short distance because concrete finishing tools will hit and damage any protruding parts and likely damage the concrete surface adjacent any protruding parts.

Figure 3A:
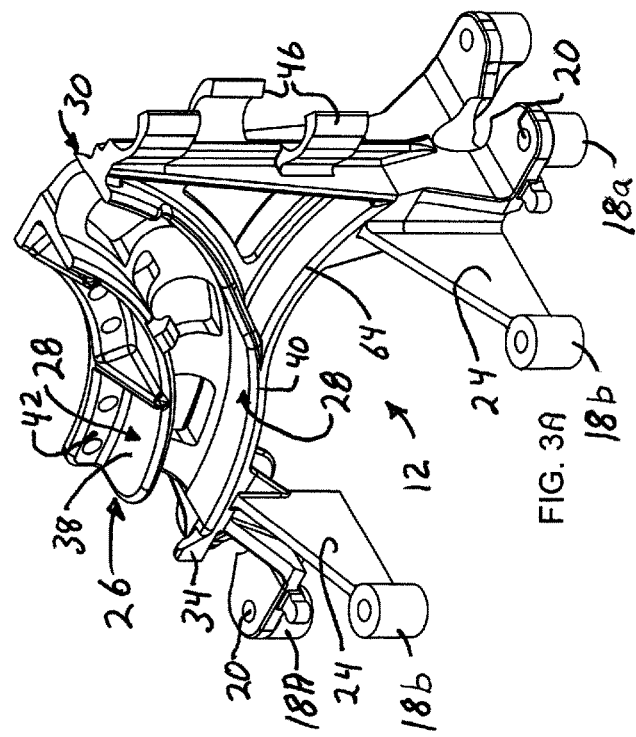
FIG. 3A is a perspective view of the base of FIG. 2 with part of the top cut off.

If the planned thickness T of slab 23 is less than the combined height of the base 12, optional plate 21 (when present), housing 14 and cap 72, then the base 12 may optionally be cut off in order to allow the total height of the parts to be located at the surface of the concrete slab 23, with the (optional) connector 16 adjusting the height as needed if the cut base is not correct. While the inlet and outlet ends 26, 30 and intermediate support 28 are shown as extending a full 90° in FIG. 2, the base shown in FIGS. 1 and 3-5 has been cut by a saw horizontally or parallel to the feet 180, so as to reduce the height of the base 12 by cutting off the outlet end 30 and holding tab 34 and cutting off part of intermediate support 28, with the intermediate support creating an outlet inclined at an angle to the vertical axis as best seen in FIGS. 1, 3A and 4. Thus, part of the top of the base 12 may be removed to reduce the height of the base 12 so that the combined height of the base, housing 14, cap 72 and optional plate 31 are about the same as or slightly less than the thickness T of the concrete slab 23 entraining the base and housing and cap during use as in FIG. 1. The base 12 may be configured to allow portions of the intermediate support 28 and outlet end 30 be manually broken off. A neat cut or straight-cut on the upper end of the base 12 is not essential when the connector 16 is used as the connector 16 advantageously adjustably positions the housing 14 at the desired vertical location relative to base 12. But advantageously the connector 16 allows the bottom of the housing 14 to rest against part of the top of the base 12 to help stabilize the housing.

While less preferable than a continuously curved surface, the conduit support may comprise only enough structure in the base 12 along the inner bend of the tube 32 to guide the tube so it bends, curves or is otherwise retained along a preferably continuous 90° arc without kinking or being displaced. The 90° arc preferably has a constant radius of curvature that is between about 0.5 and about 1 times the thickness T of the slab 23 (at the location of the bracket 10). Thus, for a six-inch thick slab 23, the radius of curvature for the conduit support formed by ends 26, 30 and intermediate support 28 is between about 3 to about 6 inches. But the curvature will vary, especially with thick slabs. The curvature is preferably sufficient to prevent undesired kinking of the tube 32 and any inner elongated member 33.

The support for the tube 32 at the inlet end 26, intermediate support 28 and outlet end 30, and more preferably with a continuous support or structure extending between the supports at the inlet end 26, intermediate support 28 and outlet end 30 are arranged in a curved manner along the desired curve of the tube 32. It is also believed suitable to have discrete supports at the inlet end 20, intermediate support 28 and outlet end 30, with no continuous structure extending between the locations of inlet end 26, intermediate support 28 and outlet end 30. It is further believed suitable, but less preferable, to have discrete supports at only two of the locations of the inlet end 26, intermediate support 28 and outlet end 30. Less desirable, is a single support for the curved conduit before the tube enters the housing, as described later. As the upper end 30 is at the housing, if a single tube support is used it occurs preferably as the intermediate support, spaced a distance from the bottom of the housing 14.

Thus, the intermediate tube support 28 may comprise a flat surface extending laterally from the housing 14 and curving through an arc of about 90°, or the curved surface may comprise a series of laterally extending, straight posts defining an arc of about 90° between the inlet and outlet ends 26, 30 and with intermediate support 28 between those ends. Likewise, because the intermediate support 28 need not be a continuous surface or extend continuously over an arc of a defined length or angle, the intermediate support 28 may comprise one or more restraints located a suitable distance from the inlet end 26 or outlet end 30, and spaced a distance laterally from such end(s) to define a location on a curve along which the tube 32 bends during use. The tube 32, and any members it may contain, has some inherent stiffness limiting its flexibility, which will limit its bending ability without kinking, and it is thus possible to support a circular loop of material or an adjustable clamp at a location to achieve the desired curvature and pass the tube 32 through the loop or clamp in order to define and control the bending and curvature of the tube relative to the base 12 (as described later regarding FIGS. 13 and 19.

Advantageously, the tube 32 is guided by at least two, spaced apart tube supports before entering housing 14, one of which supports is preferably the inlet end 26 or outlet end 30, and the other of which is the intermediate support 28 that is located on the desired curve between the at least one of the ends 26, 30. The further apart the supports the more likely it is that the curvature will be larger and kinking avoided. In the embodiment of FIGS. 13-19, the tube 32 passes through one tube support before entering the housing 14 while in the embodiments of FIGS. 20-27, the tube 32 passes through two tube supports before entering the housing 14.

But preferably sufficient supports are provided to bend the tube 32 along two or more discrete surfaces or one curved surface. Thus, even if the tube support is provided only along the inside bend of the tube 32 by intermediate support 28, the configuration of the tube support curves not only along the roughly 90° arc but preferably also curves around to at least partially encircle the tube 32, but with a larger radius of curvature (or diameter) than the tube. This doubly curved surface configuration of the tube support surface provides an increased contact area between the tube support and the tube 32 compared to a surface having a single curvature, as arises with a flat surface extending laterally but continuously curved in a 90° arc. The tube support preferably, but optionally, has a constant rate of curvature, both along the preferred 90° arc preferably formed by inlet end 26, intermediate support 28 and outlet end 30, and also preferably, but optionally, has a constant rate of curvature encircling all or part of the tube 32, as the tube support guides the tube between the inlet 26 end and outlet end 30.

In the depicted preferred embodiment, the intermediate support 28 has a curved inner surface 38 to prevent kinking, and a curved outer surface 40 spaced apart from the inner surface 38 by a distance slightly larger than the diameter of the tube 32 and with a slightly larger radius of curvature than the inner surface 38, such that the radii of curvature differ by a distance slightly larger than the diameter of the tube 32. Advantageously, a stiffening rib 42 may extend along the inner surface 38, with a plurality of fastener holes extending laterally through the rib 42 to enable a fastener (e.g., wire) to pass through the fastener holes so the support can be fastened laterally to various structural members, including rebar.

Referring to FIGS. 1-6, the outlet end 30 preferably curves upward or is orientated upward so the guided tube 32 is generally vertical at the exit end 30, which exit end is shown as located nearly above some of the mounting feet 18A. At least one, and preferably a plurality of resilient arms 46 such as curved clips 46, extend outward from the base 12 along opposing sides of an axis 48 that is preferably vertical. The resilient arms 46 are spaced apart a distance sufficient to resiliently hold connecter 50 that is preferably elongated and preferably extends along axis 48. The resilient arms 46 snap fit around the connector 16 to releasable hold the connector 16 to the base and preferably orientated along axis 48. The connector 16 is preferably an elongated member and more preferably a cylindrical member or shaft.

The inlet end 26 and structure defining an outlet end 30 immediately adjacent the housing 14 may be omitted because the location of the intermediate support 28 and opening in the bottom of the housing 14 may help control the curvature of the tube 32 sufficiently to prevent kinking. If some or all of the outlet end 30 is removed so that the intermediate support 28 and/or outlet end 30 only directs the tube 32 to curve at an angle that is not perpendicular to the planned concrete surface of the slab 23, then the tube 32 enters the opening in the bottom of the housing 14 at an angle. Advantageously, the inwardly extending bottom flange 74 (e.g., FIGS. 1, 13, 9B) that defines at least part of the bottom opening serves to guide the tube 32 from the base 12 into a more vertical orientation or to maintain that vertical orientation. Thus, the intermediate support 28 and flange 74 in the housing 14 may help curve the tube 32 into a suitable orientation inside the housing 14.

The opening in the bottom of the housing 14 defined in part by bottom flange 74 need not be centered as in FIG. 9A, but may be offset as in FIG. 9B. Ideally, the tube enters the opening in the bottom of the housing 14 parallel to the vertical axis and sidewall 70. The vertical orientation of the tube 32 preferably has the tube and its centerline parallel to the sidewall 70 of the housing, when the feet 18 of the bracket 10 are in a generally horizontal plane. If the tube 32 enters the housing at an angle, then the tube may abut the edge of the opening in the bottom of the housing and that opening along with a bottom flange 74 on one side of that opening can help curve the tube 32 and guide the tube into a more vertical orientation within the housing 14. Thus, the flange 74 around the opening in the bottom of the housing, along with the side of the opening opposite the flange 74 may contact two opposing sides of the tube to help curve the tube as it enters the housing. The opening may be offset from the centerline or longitudinal axis of the housing to further help curve the tube 32 as it enters the housing 14 as the tube may contact one edge of the opening in the bottom of the housing, the flange 74 opposite the contacted edge, and a sidewall 70 to provide three contact locations helping to curve the tube in the housing alone.

Referring to FIGS. 3B to 8 and FIG. 32, the connector 16 is preferably keyed to the body 50 so the orientation of the member relative to axis 48 and body 50 is fixed. The keying device 52 is preferably on elongated connector 16 and has a rectangular cross-sectional shape with the resilient arms 46 configured to engage the connector 16 in a limited number of orientations and the keying device 52 limits the orientation to a single orientation out of those limited number of orientations. Preferably, the keying device 52 includes a mating projection 54 and recess 56, with one of the projection or recess on the connector 16 and the other of the projection or recess on the base 12. As seen best in FIGS. 3 and 5-7, the bottom end of connector 16 has a projection 54 in the form of a rib extending along a length of the connector and extending toward recess 56 in base 12 when the connector 16 is aligned with the base 12 so as to mate the projection and recess. The projection 54 and recess 56 are thus configured to mate with each other when aligned and when the connector 16 is seated in and held by the resilient arms 46. In the depicted embodiment the recess 56 is formed by two inclined walls that limit the rotation of projection 54. The recess 56 may more closely conform to the shape of the projection 56 and thus may have a rectangular shape to receive the rectangular shape of the projection 54. In the depicted embodiment the recess 56 is located between the feet 18A adjacent the axis 48, but the recess 56 may be located elsewhere on the body 12, but is preferably adjacent to axis 48. In the depicted embodiment the rib forming projection 54 has a rectangular cross-section but other shapes can be used as long as they are compatible with the recess 56 to orientate the connector 16 relative to base 12 and preferably also relative to the position around axis 48 of elongated connector 16.

Notches or other shaped recess 60 may optionally be provided along the length of connector 16 in order to make it easier to have wires, cable ties, polymer filaments, cords, string or other flexible elongated members 62 (FIG. 1) bind the connector 16 to the base 12 or to other structural supports, such as rebar, during use at the construction site. The depicted recesses 60 are preferably curved notches on the end of short, cylindrical projections extending outward from the connector 16. The recesses 60 may be integrally molded into the connector 16. As implied earlier when the base 12 was described as being cut to place the housing and cap at the desired height, the connector 16 is optional as it may not be needed to adjust the position of the housing relative to the base 12.

The bottom of the feet 18 are preferably on substantially the same plane so as to abut form 22 or plate 21 during use without distorting or twisting the base 12. The inlet end 26 of the tube support may be on substantially the same level as the feet 18 or offset from the plane of the feet 18, depending on how the tube routing which will vary with the particular use of the base 12. As seen in FIGS. 1-6, the inlet end 26 is offset vertically above the plane of the feet 18 by support flanges 24 extending between the feet 18 and the tube support. Viewed from the side as in FIGS. 1-4, the base 12 resembles a shoe with the inlet 26 at the toe of the shoe and the connector 16 at the heel, with the intermediate support 28 forming the upwardly curved tongue of the shoe and with flanges 24 offsetting the main body of the shoe from the surface of form 22 on which the feet 18 rest during use. As desired, the toe and heel portions of the base 12 may be further supported by struts 64 extending between the feet 18A at the toe and heel of the base 12. The struts 64 preferably form openings larger than the aggregate used in the concrete slab so as to more easily entrain the bracket in the concrete. The particular configuration and arrangement of the feet 18, support flanges 24 and struts 64 will vary, and one or both of the flanges and struts may be greatly changed in form and location, or possibly omitted.

Referring to FIGS. 3-7 and 9, the housing 14 is tubular or hollow, with one or more side walls 70 enclosing the sides of the housing. Preferably the sidewalls 70 take the form of a cylindrical sidewall with a top opening removably closed by cap 72 and a bottom opening sized to receive tube 32 and optionally to also receive outlet end 30 of the base 12. The sidewall and cap are preferably each continuous surfaces with no openings so as to prevent wet concrete from passing through the sidewall and/or cap and entering the housing. In the depicted embodiment the bottom opening of housing 14 is circular and defined by an inwardly extending bottom flange 74 (FIG. 1). The cap 72 has an upward facing exterior surface in which are optionally formed a plurality of wrenching recesses 76. The cap 72 may be color coded according to function, such as using red indicia on the cap 72 to indicate hot, blue indicia on the cap to indicate cold, or yellow indicia on the cap to indicate electrical, or green indicia on the cap to indicate computer wires within the tube 32 covered by cap 72. As best seen in FIG. 1, the cap 72 may be a thin piece of material such as formed metal or molded plastic, with wrenching surfaces 72 in the outer facing surface.

One or more whiskers 78 preferably, but optionally, extend upward from the top of the cap 72. The whiskers may be inserted through holes formed in the cap 72, or inserted into and glued into holes in the outer surface of the cap. Polymer monofilaments from one half to several inches long and a few thousands of inch in diameter are believed suitable for the whiskers 78. In the depicted cap 72, seven monofilaments extend outward from a central, circular recess 78 in the cap and extend a distance of about 0.5 to 4 inches above the main surface of the cap 72 and housing 14. The whiskers are selected to be long enough to stick up above the surface of the concrete slab 23 in which the housing and whiskers are embedded and the whiskers are flexible enough so they do not break off during bull floating and power troweling of the concrete surface so the whiskers can be visually seen extending from the concrete and identify the location of the cap 72, housing 14 and conduit 32 enclosed in the housing after the concrete slab 23 is finished and hardened.

The cap 72 preferably has a depending flange that is threaded, with the threads 82A orientated and configured to threadingly engage mating threads 82B on the housing 14. Advantageously the outer surface of the depending flange on the cap 72 is threaded and the inside of housing 14 is threaded adjacent the top of the housing so the cap 72 can removably close the top of the housing. The threads 82 are preferably such that the cap can be located inside or flush with the top periphery of the housing 14. The depicted cap 72 and housing 14 have the top surface of the cap seating on the inside of the sidewall 70 so the cap has external threads and the housing has internal threads. The cap 72 could have interior facing threads mating with exterior threads on sidewall 70, so the cap fits over the housing and increases the height of the housing. Removable connectors other than threads may also be used to releasably connect the cap 72 and housing 14 and to removably cover the top opening of the housing. Rotatable connections are preferred, such as bayonet mounts, but non-rotating connections may be used, as tabs connected to the cap that slide radially inward or outward to engage mating recesses in the housing or tabs that slide axially to engage mating recesses in the housing.

The cap 72 has an inner surface that is spaced apart a pre-determined distance from the adjacent facing surface of bottom flange 74 of the housing 14. The distance between the facing surfaces of the cap 72 and bottom of the housing is large enough to allow the tube 32 and any inner elongated member 33 inside the tube 32 to be contained during pouring of the concrete deck and connected to another tube, wire, conduit or other member after the concrete hardens. Typically, when the inner elongated member 33 comprises a water tube or conduit this requires a coupling tool (FIG. 26) with expandable an expanding insert to fit inside and then widen to expand the water conduit or tube 33 or optionally a coupling 84 (FIGS. 1, 26) to mate them with a fitting that is typically barbed, ribbed or threaded for subsequent connections. The space typically needed for the coupling tool usually requires a volume of about an inch or an inch and a quarter in height and about the same in diameter, with a height of from about 0.7 inches to about 1.8 inches and a corresponding lateral space or diameter being believed preferable. Larger spacing may make it easier to manipulate the tubes and conduits within the housing 14, but that also requires housings 14 with a greater height and that causes the housing to extend further into the concrete deck which weakens the concrete.

Although the above describes one particular application, the invention and general method outlined may be used in various applications such as water lines, hydronic heating, electrical wiring or gas piping, where the appropriate types of couplings, fittings or connectors would be selected for attaching tubes 32, or tubes, wires or other inner elongated members 33, to members within or above the slab 23 and housing 14.

In order to reduce cracking of the concrete, the outside corners or exterior junctures of the housing 14 are preferably curved so as to avoid sharp corners being formed in the concrete that entrains the housing. A radius of about ⅛ to about ½ inch is believed suitable. The top end of the housing 14 is preferably curved in the axis perpendicular to the concrete surface with a continuously curved, cylindrical sidewall 70 being preferred. But multiple flat sides joined by rounded corners are suitable, as a rectangular, hexagon or octagon shape. The top edge and side of the assembled housing 14 and cap 72 may be sharp and effectively flat as any concrete laying on top of the cap 72 will be removed with the cap in order to access the tube 32 inside the housing 14 and cracking of the concrete immediately above the cap 72 will not matter as that concrete and the cap will be removed.

Figure 13:
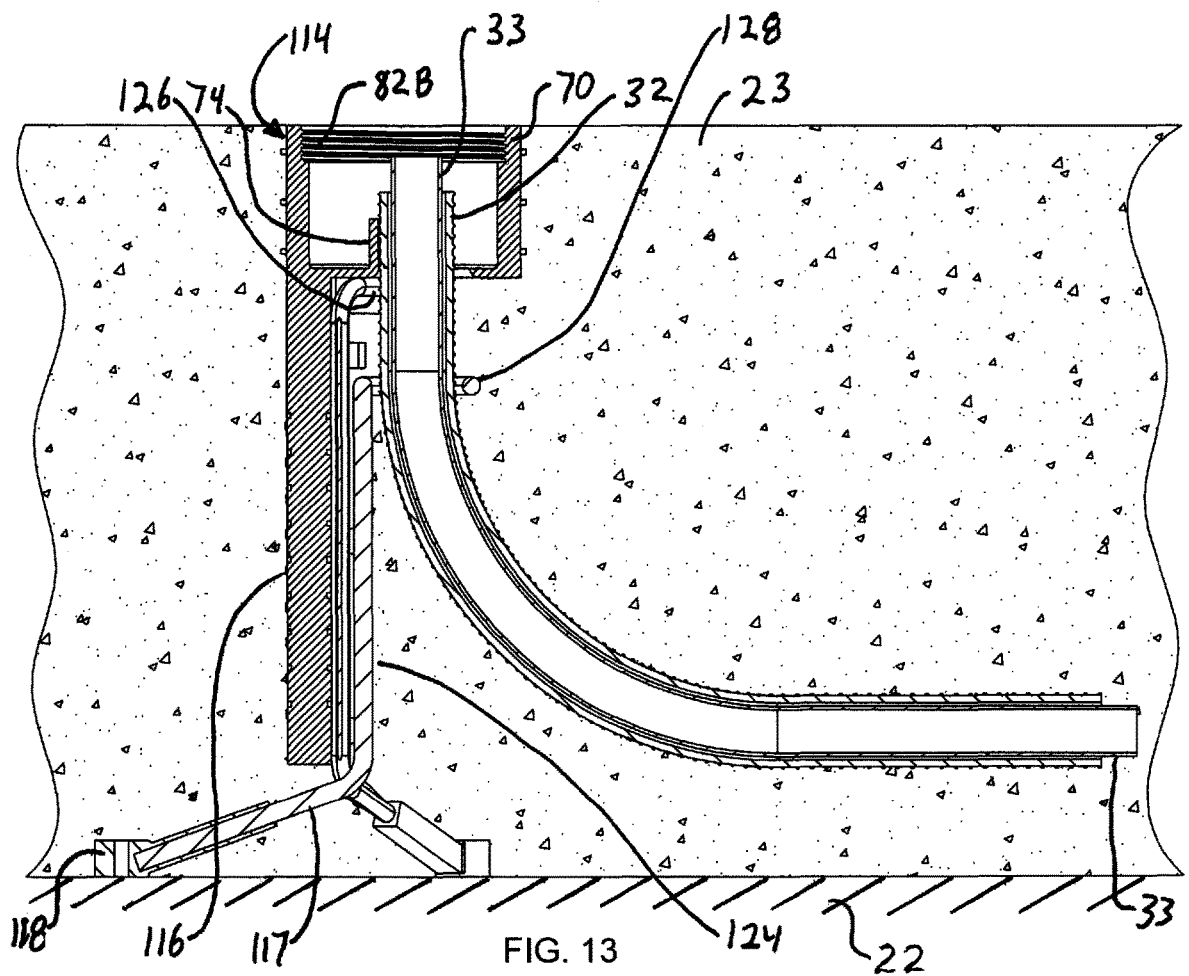
FIG. 13 is a sectional view of a further embodiment of a bracket and tube entrained in concrete.
Figure 14:
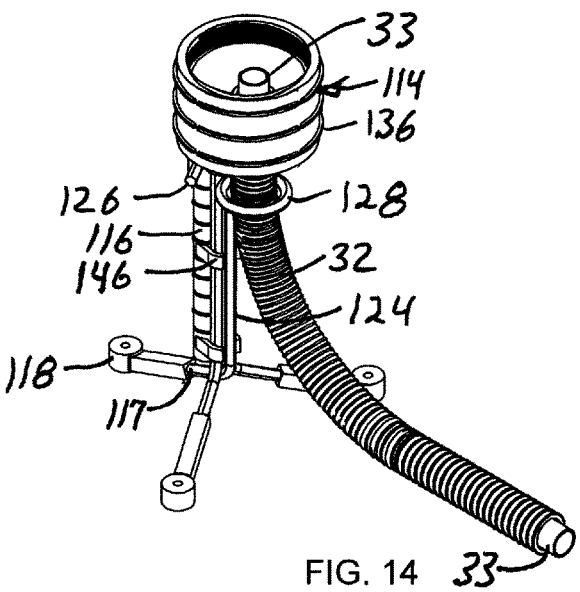
FIG. 14 is a perspective view of the bracket and tube of FIG. 13.
Figure 17:
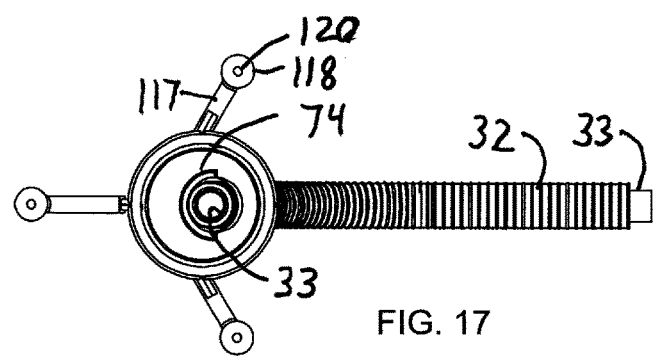
FIG. 17 is a top view of the bracket and tube of FIG. 15.
Figure 15:
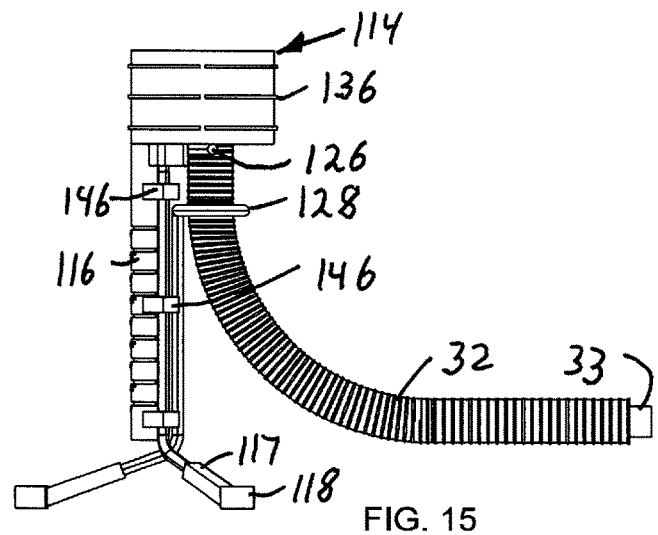
FIG. 15 is a side view of the bracket and tube of FIG. 14.
Figure 16:
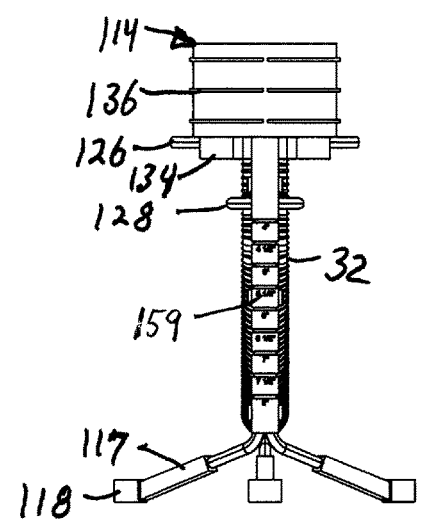
FIG. 16 is a back view of the bracket and tube of FIG. 15.

The connector 16 adjusts the vertical position of the housing relative to the base and maintains the orientation of the housing with respect to the base 12. The connector may be joined to the housing various ways. As shown in the Figures, the connector 12 joins the housing 14 at the bottom wall and sidewall 70 of the housing. It is desirable that the housing 14 (and cap 72) not tilt or rotate relative to the base 12 once the height of the housing is set relative to the base by adjusting the connector 16. Advantageously, the housing 14, base 12, connector 16 and cap 72 are each separately molded but each is molded from one pour of polymer or plastic. ABS, glass filled polypropylene, glass filled polyethylene or other glass filled polymers are believed suitable. As best seen in FIGS. 1 and 13, the housing 14 and connector 16 may be integrally molded as a single part using a single pour of material, to simplify connecting them later. But the connector 16 and housing may be made separately and fastened, as by bonding, bayonet connections, snap fit connections or threaded fasteners. The top of connector 16 may fit into a downward facing recess in the bottom or side of the housing with the recess shaped to mate with the connector in a sufficiently tight manner to restrain the housing from tilting and to hold the top of the housing and cap parallel to the feet 18 (e.g., horizontal). The top of connector 16 that is mechanically fastened to the housing is preferably flat and horizontal. A screw may optionally be inserted through the bottom of the housing to securely connect the parts together.

An illustrative housing 14 has sidewall 70 about ⅛ to ¼ inch thick with a cap 72 about ¼ to ⅜ inch thick. The housing 14 is about 1.5 to about 3.5 inches high measured on the outside of the housing, preferably with a cylindrical sidewall and curved edges on the bottom of the housing. The housing 14 has a diameter or larger outside dimension of about 3.5 inches with an inside diameter or larger dimension of about 3 inches between opposing sidewalls 70. The opening in the bottom of the housing 14 encircled by the flange 74 is about 1.2 to 1.8 inches in diameter, or largest dimension if a non-circular housing is used. These dimensions are for a tube 32 about 1 to 1.25 inches in diameter and will vary as the tube diameter increases or as the room needed to achieve connections with the tube 32 or tubing, wires or other parts carried thorough the tube 32 change. The diameter or largest dimension of the housing 14 may be increased if it is desirable to coil the tube inside the housing in order to allow a greater free length of the tube after removal from the housing. But the larger lateral dimension weakens the concrete deck.

Referring to FIGS. 13-19, a further embodiment is shown which has a different base 12, referred to herein as base 112 (FIG. 19a) which is connected to housing 114 and optionally connected to connector 116. The corresponding parts from FIGS. 1-12 have the numbers increased by 100. Thus, housing 114, connector 116 and cap 172 correspond to and are similar to housing 14, connector 16 and cap 72, respectively. But the base 112 is different than base 12.

As best seen in FIGS. 13-16 and 19 (19A-19B), the base 112 is shown as a wire frame base having three laterally and downwardly extending legs 117 each ending in a foot 118. Each foot 118 is preferably, but optionally configured to have a fastener opening 120 to allow the body of a fastener (e.g., nail or threaded fastener) to pass through the opening or to have a projection (e.g., stake, spike) to allow the projection to be embedded in form 22, such as plywood. Each foot 118 is spread apart from the other feet so that the base 112 provides a stable base, preferably a free-standing base that does not easily tip over when resting on form 22, just as base 12 preferably does not easily tip over when resting on form 22 without being fastened to the form by fasteners.

Figure 19B:
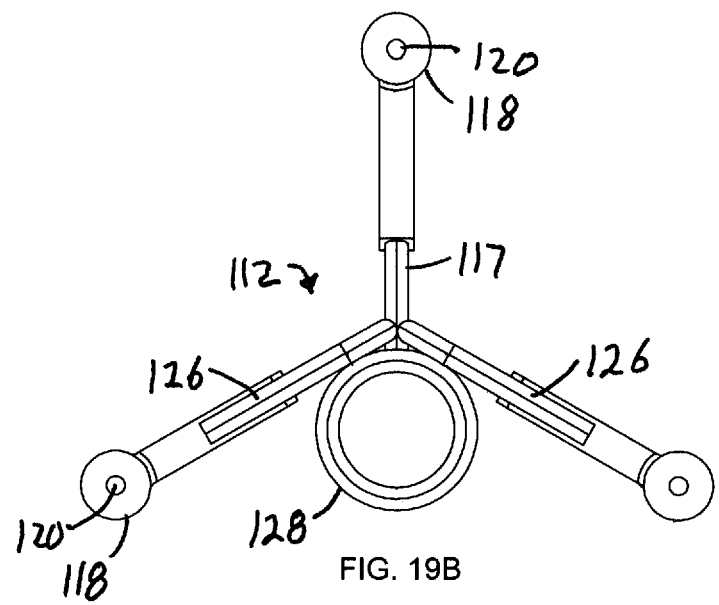
FIG. 19B is a top view of the base of FIG. 19A.
Figure 19A:
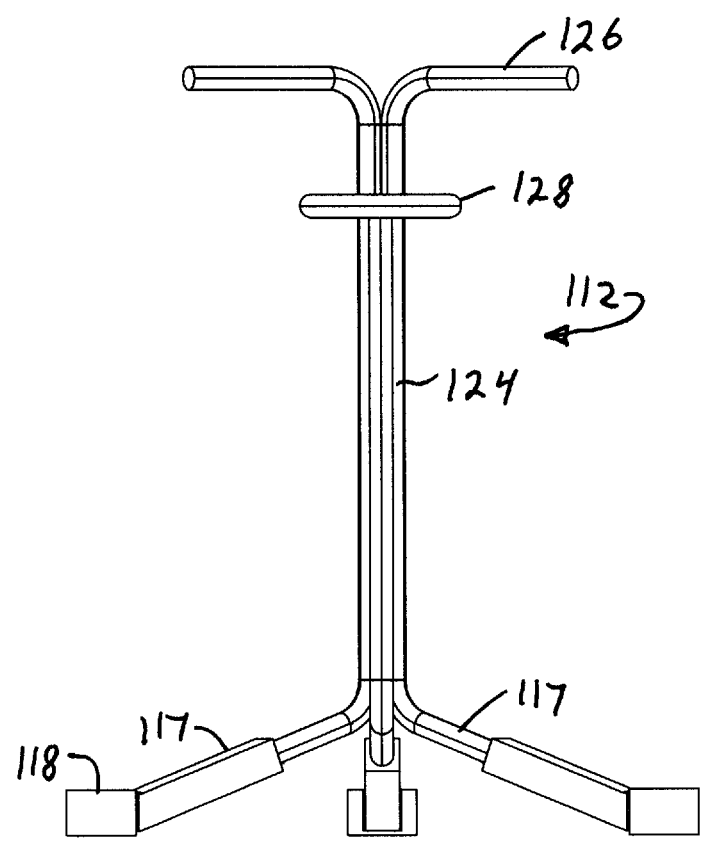
FIG. 19A is a front view of the base of FIGS. 14 and 15.

The legs 117 are connected and preferably form part of an upwardly extending body 124, shown as a vertical body formed by bending the legs 117 upward and fastening them together, preferably by spot welding or otherwise binding the wires or rods forming the three legs 117 together to form the body 124. Twisting the three wires or rods forming the legs is believed suitable to form body 124. At a top end of the body 124 one or more of the wires forming the legs 117 and body 124 is bent laterally outward to form upper mounting arms 126 for the housing 114. In the illustrated embodiment two upper mounting arms 126 are shown, each preferably also part of a different wire forming one of the legs 117. Thus, a wire or rod can be bent to form a foot 118, leg 117, part of vertical body 124, and part of upper mounting arms 126, with the vertical body parts 124 preferably connected together to form the body 124. Advantageously, there are three mounting legs 117, each spaced about 120° apart, each ending in a foot 118 in substantially the same plane, with the body 124 being at a central juncture of the legs as best seen in FIG. 19B.

Intermediate the legs 117 and upper mounting arms 126 one or more tube supports are formed to guide tube 32 and maintain it in position. In the embodiment of FIGS. 13-16 and 19 only one tube support is shown, the intermediate tube support 128. The intermediate tube support 128 is shown as a circular loop of wire that is welded or otherwise connected to the vertical body 124. The intermediate tube support 128 may comprise one of the wires forming legs 117 being bent laterally outward from body 124 to form the circular loop of the intermediate tube support 128, with the other two wires each forming a leg 117 extending upward to form the two depicted upper mounting arms 126. The intermediate tube support 128 is spaced below the upper mounting arms 126 a distance so that tube 32 passing through the tube support 128 is sufficiently aligned with the bottom opening of the housing 114 to avoid kinking or unacceptable bending of the tube during use. A spacing of about 1-3 inches between arms 126 and support 128 is believed suitable when the center of the intermediate tube support 128 is laterally (horizontally in the drawings) within about 1 inch of the center of body 124. The intermediate tube support 128 corresponds to the intermediate support 28 in FIGS. 2-5.

Figure 18A:
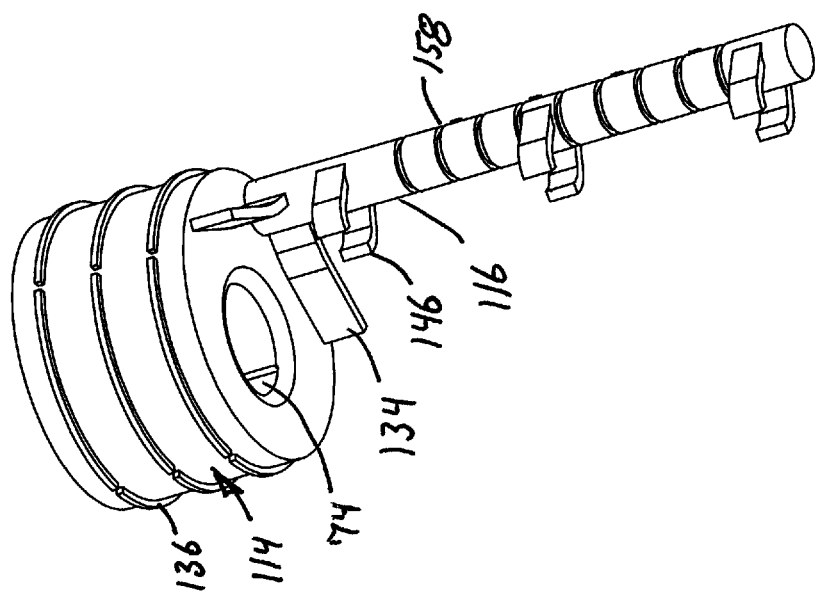
FIG. 18A is a perspective view looking upward, of the housing and connector of FIG. 15.
Figure 18D:
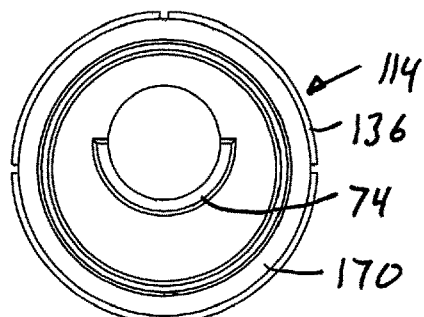
FIG. 18D is a top view of the housing and connector of FIG. 18B.
Figure 18B:
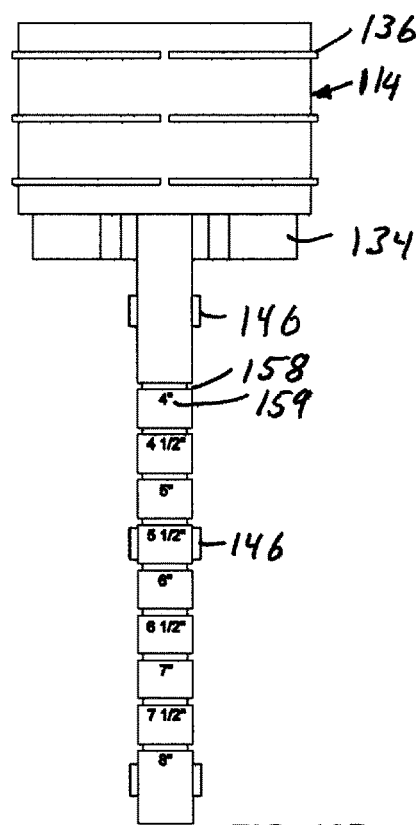
FIG. 18B is a back view of the housing and connector of FIG. 18A.
Figure 18C:
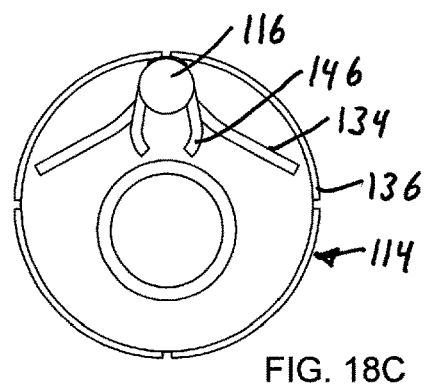
FIG. 18C is a bottom view of the housing and connector of FIG. 18B.

Referring to FIGS. 18A-18C, at least the lower end of connector 116 preferably has a plurality of narrowed sections 158 at regular intervals in order to provide weakened sections on the connector. The weakened sections 158 are preferably visible and sufficiently weaken the connector 116 to allow the connector to be manually broken off, or manually cut off at any of the narrowed sections 158 in order to vary or adjust the length of the connector 116. Adjacent each weakened section 158 may be placed printed indicia 159 reflecting the length of the connector 116, but more preferably reflecting the distance from the bottom of the feet 118 to the top edge of the housing 114 and cap 172 when the connector 116 is connected to the base 112 at a predetermined location and when no plate 21 is used. If the plate 21 is used the thickness of the plate is accommodated in the printed indicia 159 as the connector extends along the height of the plate because the bottom of the connector 116 abuts whatever surface the base 112 rests upon. Thus, if the connector 116 is broken off at a weakened section 158 marked by printed indicia 159 indicating 6 inches, and the connector 116 is then connected to the base 112 in a predetermined (normal) position with the bottom of the connector 116 resting on the surface on which the base 112 rests, then the distance between the feet 18 of the base and the top of the housing 114 connected to the connector, is 6 inches.

Figure 32:
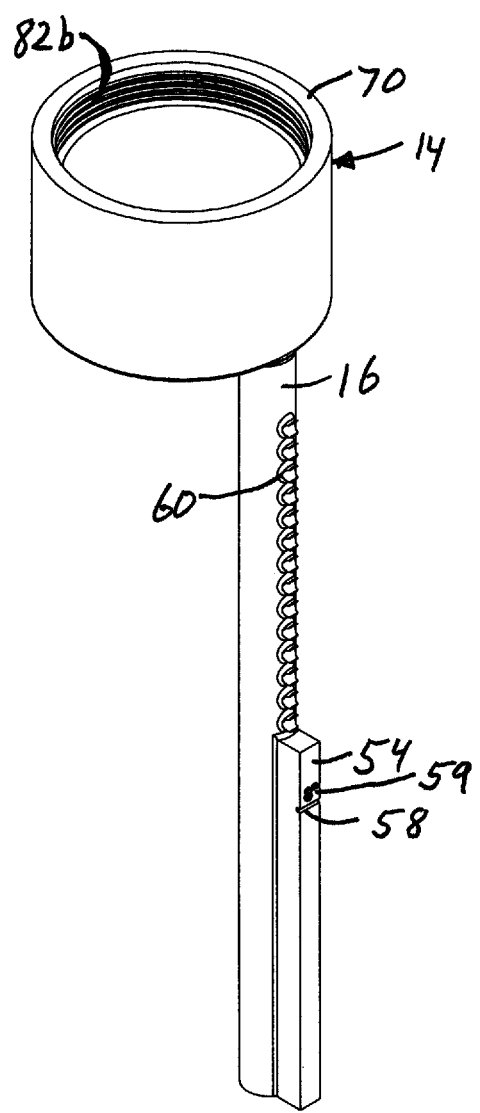
FIG. 32 is a perspective view of a connector and housing with an elongated key.

By referring to the printed indicia 159 and weakened sections 158 and using them to adjust the length of the connector, the top of the housing 114 and cap 172 may be placed at the surface of the concrete slab 23. By adjusting the length of the connector 116 the relative position of the housing 114 and base 112 may be adjusted. By keying the orientation of connector 116 to the housing 114 using the keying device 52, the orientation of the connector 116 and the housing 114 that is coupled to the connector 116 may be determined. To allow sufficient length adjustment, the keying projection 54 may extend along a length of the connector 16 as best seen in FIG. 32, with the key and connector being cut to the desired length to position the housing 14 relative to the top of the concrete slab 23.

Figure 2:
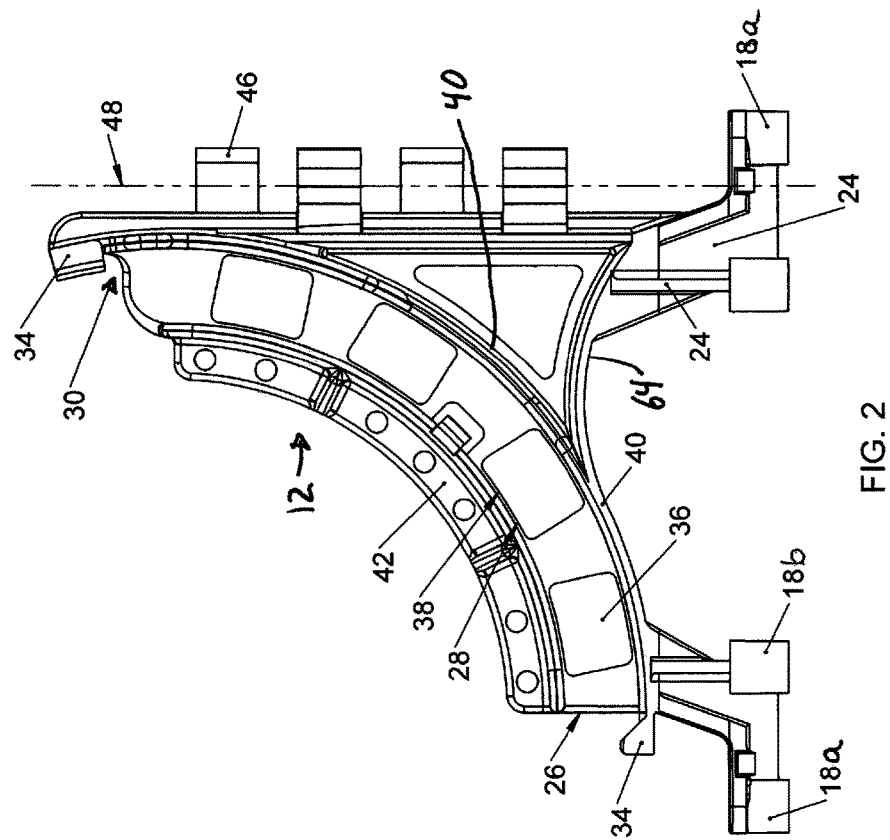
FIG. 2 is a side view of a bracket base.
Figure 10:
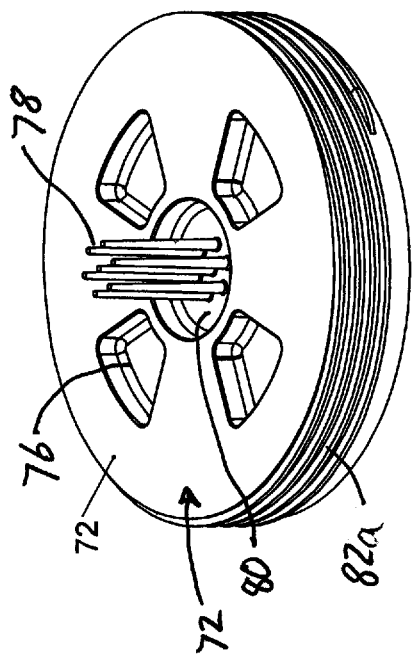
FIG. 10 is a perspective view of a cap.
Figure 11:
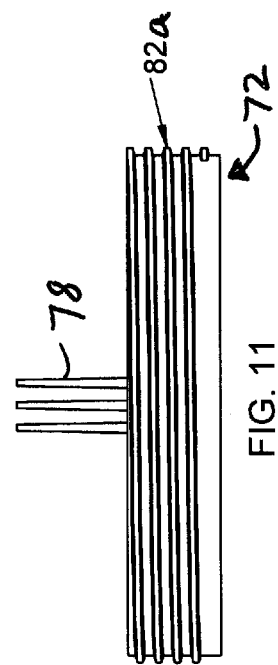
FIG. 11 is a side view of the cap of FIG. 10.
Figure 12:
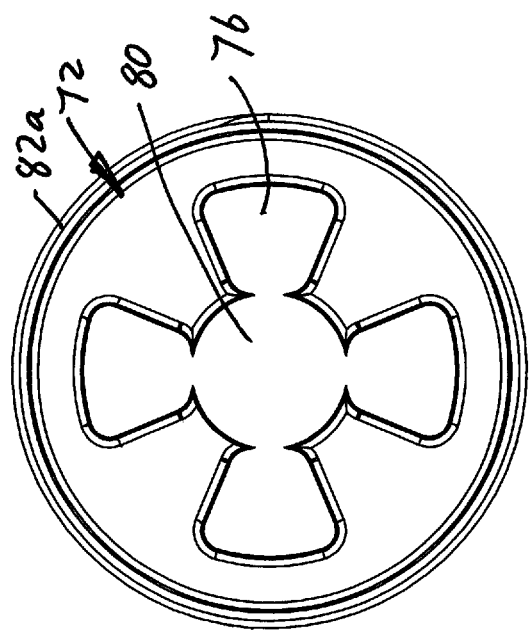
FIG. 12 is a bottom view of the cap of FIG. 11.

The Referring to FIGS. 13-19, housing 114 is connected to or rests on the upper mounting arms 126 and is preferably, but optionally fastened to connector 116. The connector 116 is preferably of a suitable plastic the same as connector 16. The connector 116 is preferably an elongated body such as a cylinder, having weakened planes 58 (FIG. 16) orthogonal to the longitudinal axis of the elongated body. Printed indicia 59 adjacent each weakened plane 58 can be used to position the connector 116 relative to base 112 and/or to position housing 114 and cap 172 relative to the surface of concrete slab 23. Connector 116 has resilient arms 132 configured to resiliently engage body 124 of base 112 so the resilient arms 132 may snap onto the vertical body 124 to hold the connector 116 in position relative to body 124 and base 112. The resilient arms 132 on connector 112 are analogous to resilient arms 46 on the base 12 (FIG. 2-3).

As best seen in FIGS. 14-16 and 18, two positioning stops 134 extend downward from the bottom of housing 114 and one end of each stop preferably connects to the upper end of connector 116. The top end of connector 116 is connected at an outer periphery of the bottom end of cylindrical housing 114. The two positioning stops 134 are shown as two ribs, each having a rectangular cross-section and extending across the bottom of the housing along intersecting chords. The each stop 134 is located to fit on the outside of a different one of the upper mounting arms 126 of base 112. The stops 134 abut opposing and facing sides of the upper mounting arms 126 to limit rotation of the housing 114 and connector 116 about the longitudinal axis of the connector, analogous to the axis 48 of connector 16 in FIG. 2. The position stops 134 define a shaped recess that cooperates with the projecting upper mounting arms 126 to form keying device like that of keying device 52, so as to orientate the housing 114 relative to the base 112.

The bottom of the housing 114 has an opening in it and the position stops 134 engage the upper mounting arms 126 to locate the opening in the bottom of the housing 114 relative to the intermediate conduit support 128. Preferably, the position stops 134 engage the upper mounting arms 126 so the opening in the bottom of the housing 114 is vertically aligned with and above the intermediate conduit support 128 so tube 32 extends fairly straight between the intermediate conduit support 128 and through the opening in the bottom of the housing. Depending on the cross-sectional dimensions of the connector 116 and body 124, the opening in the bottom of the housing 114 may not be centered on the longitudinal axis of the cylindrical housing (the preferred housing shape), so the opening in the bottom of the housing may be offset from a centerline of the housing.

Referring to FIGS. 13-16, the sidewall 70 of housing 114 (or of housing 14) may have a contoured exterior surface to better engage the poured concrete and resist movement of the sidewall after the concrete hardens. Grooves or ridges or ribs 136 in the outer surface of the housing are believed suitable, with rounded cross-sections being preferred. Ribs inclined to the concrete surface or similarly inclined grooves in the outside surface of sidewall 70 are also believed suitable, but less desirable. The ribs need not be continuous, as shown in FIGS. 18A-18C.

Referring to FIGS. 20-27, a further embodiment is shown with two tubes 32 each entering a separate circular opening in the bottom of housing 214. The base 212 has three legs 217 preferably, but optionally, with a foot 218 (and fastener hole 220) on the end of each leg. The legs 217 join to and preferably form a body 224. Two intermediate supports 228 are each connected to the body 224 intermediate the top and bottom of the body but closer to the top. At the top of the body 224 are upper support arms also referred to as upper tube supports 230. There are preferably two separate upper tube supports 230, each preferably taking the form of a circular loop formed by bending one of the wires forming the legs and body, into a circular loop large enough to pass the tube 32, but preferably not much larger. A single tube support large enough to pass two tubes 32 is also believed suitable. The upper tube supports 230 correspond to the outlet end 30 of the bracket 10 as they are located at and preferably coaxial with or aligned axially with the openings in the bottom of housing 214. Each of the upper tube supports 230 extends outward from the body 224 of the base 212 a distance selected to align with the opening or openings in the bottom of the housing through which the tube 32 passes.

A connector 216 connects to base 212 and preferably nests between the two upper tube supports 230 extending intermediate the bottom and top of the base 212 and preferably at the top of the base. Each of the upper tube supports 230 extends outward from the body 224 of the base 212 a distance selected to align with the openings in the bottom of the housing through which the tube 32 passes and in the preferred embodiment the loops of the supports 230 are joined to form with the connector nestled in the doubly curved recess of the adjoining loops.

The two intermediate supports 228 are located relative to the body 224 to achieve the desired curve of the tube 32, which curvature is selected to avoid kinking of the tube and more importantly kinking of the inner elongated member 33 inside the tube 32. In the depicted embodiment the two intermediate supports 228 do not extend far away from the body 224 and preferably end in hoops or clamps fastened at the body 224, to hold the tube 32 immediately adjacent the body 224. The intermediate supports 228 may each comprise one of the loops shown in FIG. 14-16 or one of the circular loops of upper tube supports 230 that at least partially encircle and guide the tube to assume the desired curvature. The intermediate supports 228 preferably comprise adjustable clamps that can encircle at least part of the periphery of the tube 32 and preferably grip the tube when tightened to hold the tube in position relative to the base 212 and bracket 210. Clamps having a threaded fastener extending between the end of two curved sections which encircle part of the tube 32 in order to tighten or loosen the clamps and adjust the grip on the tube 32 passing through the clamp are believed suitable. The loops or clamps may be sized to be slightly larger than the outer periphery of the cross-section of the tube, preferably 10-40% larger, to allow east insertion of the tube through the loops or clamps. The adjustable diameter clamps allow a larger opening to make it easier to pass the tube 32 through the connector while tightening the clamps secures the tube positon relative to the body 224 so as to provide a desired curvature to the tube and to hold the tube in position relative to the housing and/or the base 212 and bracket 10.

In the depicted embodiment of FIGS. 20-27, the intermediate supports 228 and upper tube supports 230 are effectively rings fastened to the body 224 and aligned along a desired axis to achieve a desired curvature in the tube 32 passing through those rings—when the tube hangs under the force of gravity. The tube 32 passing through the supports 228, 230 is secured to and runs a short distance parallel to the body 224 so as to enter the bottom of the housing 14 generally parallel to the sidewall 70 and generally parallel to the longitudinal axis of the housing 14 and body 224. The supports 228, 230 may be positioned laterally to body 224 different distances, and positioned vertically along body 224 to achieve a desired curvature of a tube 32 passing through the supports, which curvature is selected to prevent kinks and preferably approximates a 90° arc, or other curvature that may be required for the tube 32. Advantageously, as shown in the figures, the rings may be aligned with the vertical axis parallel to the body 224.

Figure 25A:
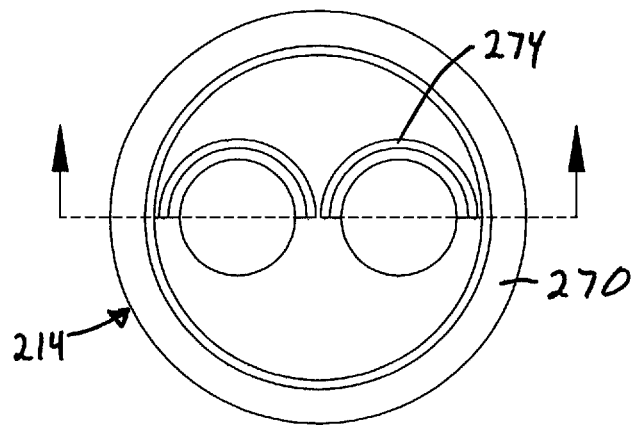
FIG. 25A is a top view of the housing of FIG. 20 with no tubes shown.
Figure 25B:
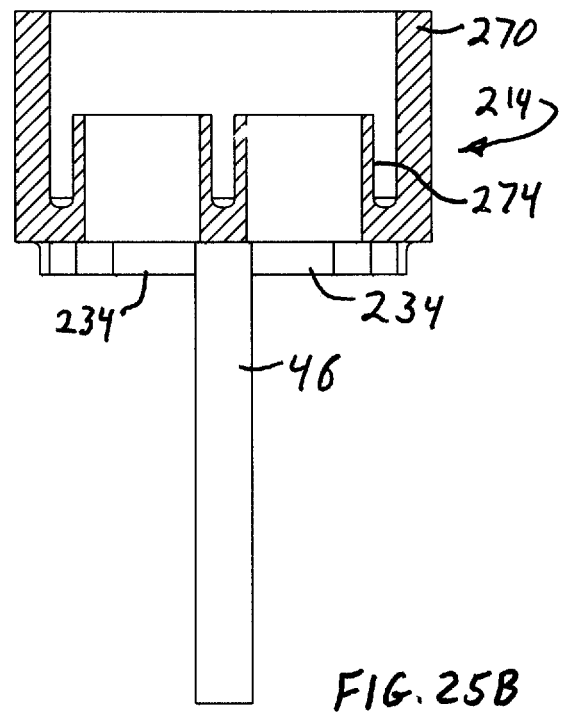
FIG. 25B is a partial sectional view of the housing of FIG. 25A taken along section 25B-25B.
Figure 26:
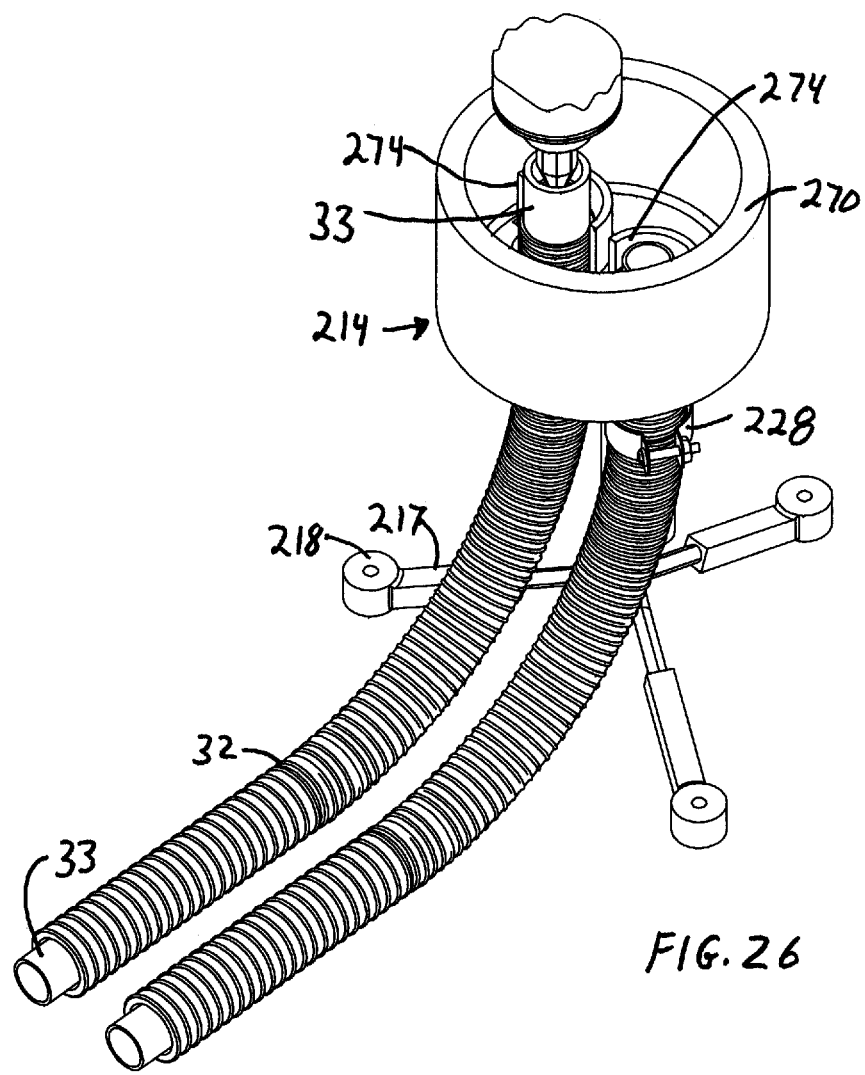
FIG. 26 a perspective view of a bracket and housing for two tubes with a partially shown connector installation tool and connector.
Figure 27B:
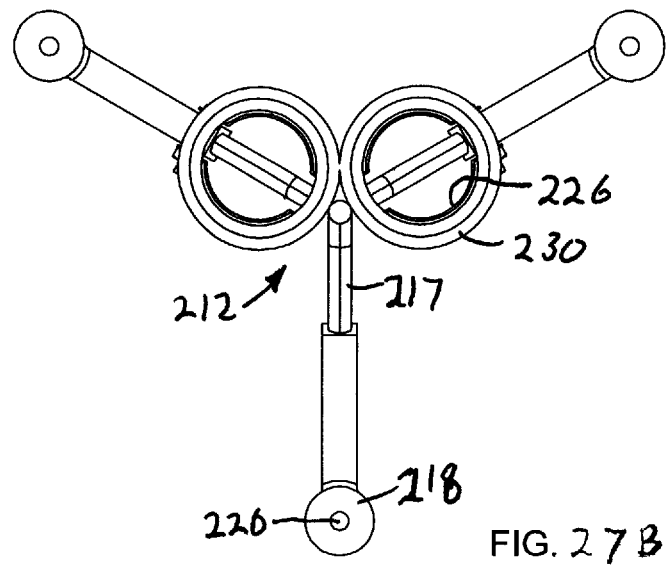
FIGS. 27A and 27B are front and top views, respectively, of the bracket of FIG. 20.
Figure 27A:
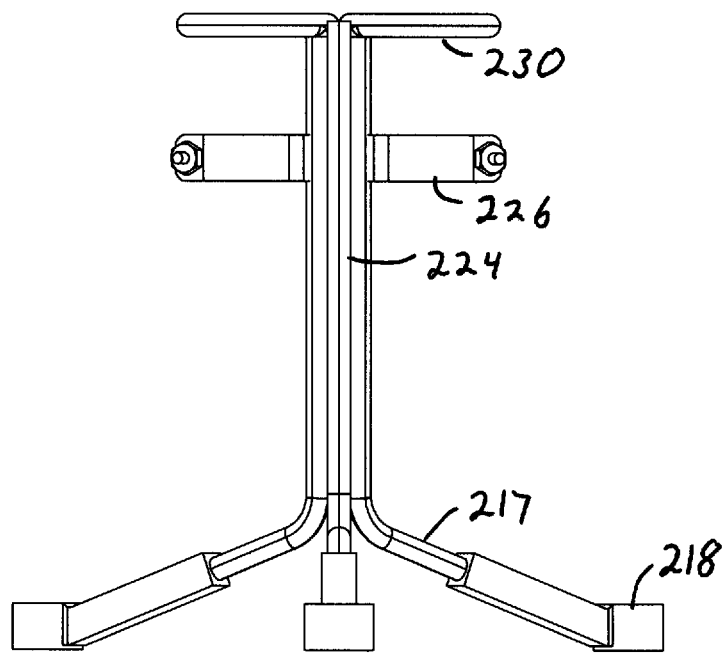
Figure 28:
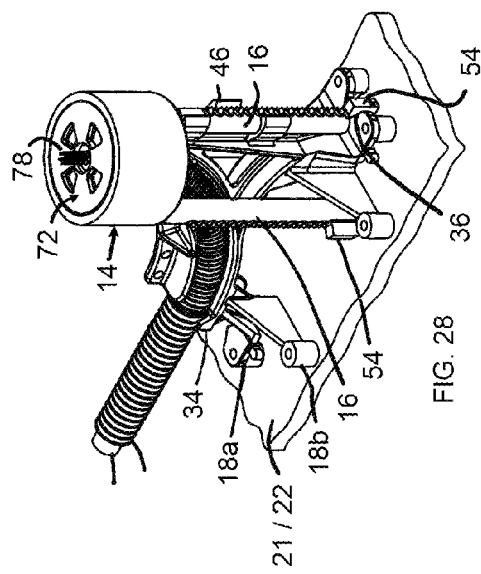
FIG. 28 is a perspective view of a bracket, housing and connector having multiple connectors with the bracket on either a plate or a concrete form.
Figure 30:
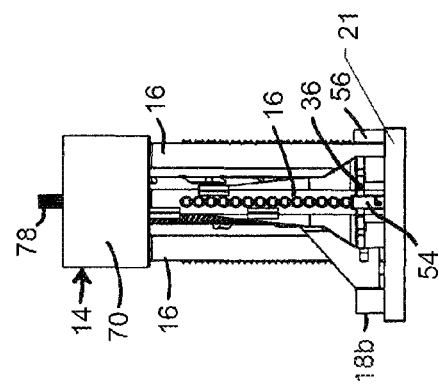
FIG. 30 is a rear view of the bracket, housing and connector of FIG. 29.
Figure 31:
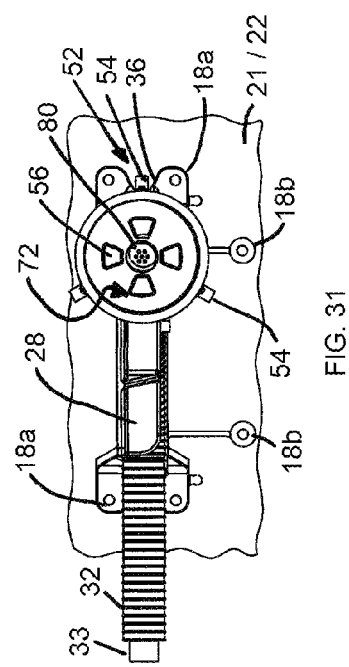
FIG. 31 is a top view of the bracket and connector of FIG. 29.
Figure 29:
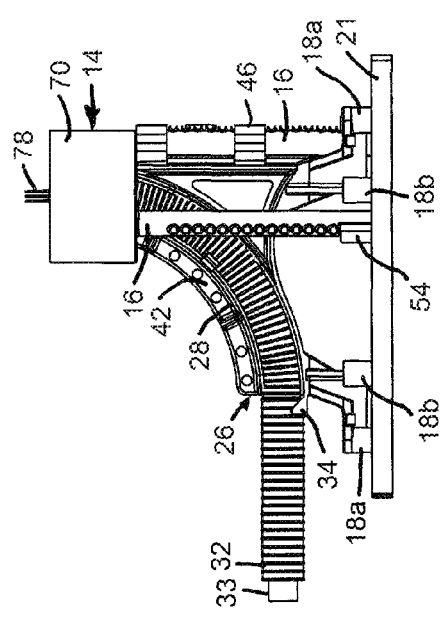
FIG. 29 is a side view of the bracket, housing and tube of FIG. 28 on a plate.

FIG. 23B shows the bottom flange 274 extending about half the height of the sidewall 70. The flange 274 advantageously extends between about 10-25% the interior height of the housing when the cap 272 is on the housing, but could extend about half way as shown in FIGS. 23B and 25B. As seen in FIGS. 23A and 25A, the flange 274 advantageously does not completely encircle the tube 34, and preferably extends around about half the diameter of the tube. The flange 274 may be flush with the opening in the bottom of the housing, or offset from the opening toward one wall 70 as shown in FIGS. 23A, 25A. The flange 274 may help guide and curve the tube 32. The flange 274 is optional (as are the flanges of the other embodiments).

Figure 24:
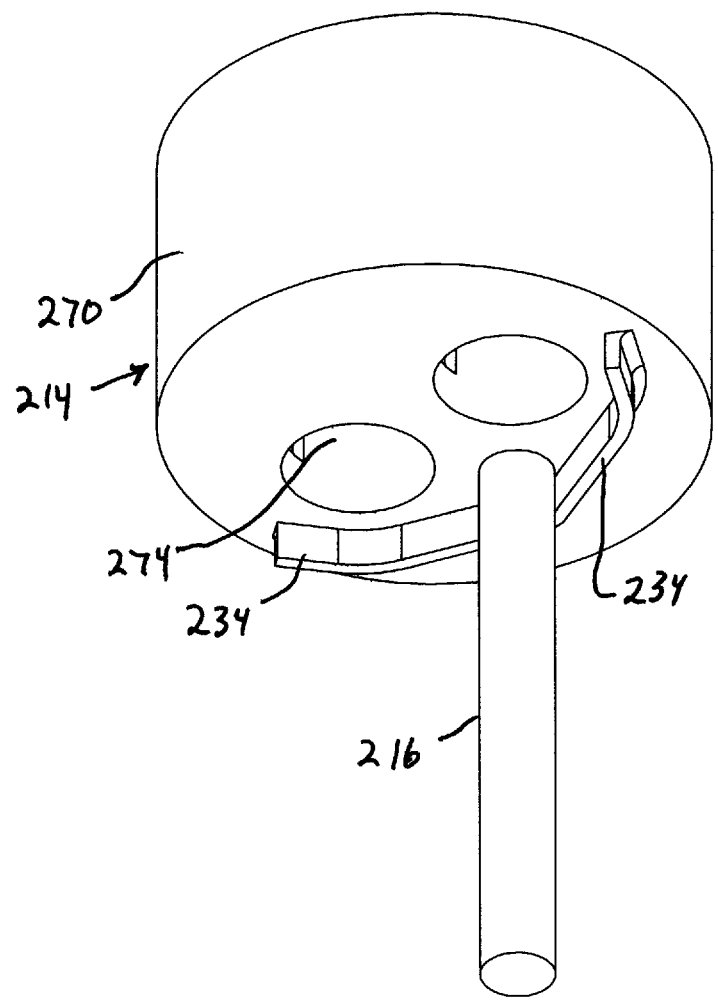
FIG. 24 is an upward looking perspective view of the housing and connector of FIGS. 20 and 21.

Referring to FIGS. 21-22, 23B, 24 and 27A-27B, the bottom of the housing 214 has positioning stops 234 depending from the bottom of the housing 214 with the stops configured to abut the outer portions of the upper tube supports 230 in order to keep the housing from rotating about the vertical axis relative to the base. The housing 214 has connector 216 coupled to the housing, preferably integrally molded with the housing or otherwise joined together as known in the art or as described herein. As seen in FIG. 24, the juncture of the connector 216 and housing 214 is preferably between the two openings in the bottom of the housing and the positioning stop 134 so that the connector fits into the doubly-curved recess between the two upper tube supports 230. The position stops 234 define a recess that cooperates with the projecting tube supports 230 to form a keying device analogous to keying device 52 that orientates the housing relative to the base.

The use is like that of the bracket of FIGS. 16-20 except there are two tubes and two loops, each holding a tube in a curved position relative to the base instead of one. In use, the base 212 is placed so the feet 218 rest on the desired surface and are fastened to that surface at the desired location. The housing 214 and connector 216 are coupled to the base 212 before or after the tube 32 is passed through the supports 228, 230. The housing 214 preferably rests on the top of the upper tube supports 230. But snap-clips on the connector 216 (e.g. FIGS. 4, 15) may hold the connector and housing in a vertically adjustable position relative to the base 212. Thus, the height of the housing 214 (and cap) may be preset by the height of the housing and base 212, or adjustable by positioning housing and connector 216 relative to base 212, or by adjusting the position of the cap relative to the housing. As desired, the connector 216 may be fastened to the base 212, as with threaded fasteners or flexible members such as wires or cable ties in connection with the recesses 56 on the connector 216. The tube 32 and any tubes 33 (which includes any members, cables, wires or other elongated members passing through the inside of the tube 32) are preferably cut to length and placed inside the housing 214, optionally being coiled inside the housing as needed. The cap 272 is then placed on the housing to keep the tube and housing contents enclosed and protected. Any part of the bracket may be further connected to a support, such as rebar—usually by flexible connections such as wire or cable ties. The concrete slab is then poured, with the whiskers 78 of sufficient length to extend above the surface of the concrete slab 23 after finishing. After the concrete in the slab hardens, removal of the cap 272 allows access to the tube and other housing contents for use, with the whiskers 78 helping to visually locate the cap on the cured concrete surface.

Referring to FIGS. 28-31, plural connectors 16 may be used to support the housing relative to the base 12 or other bases described herein. Most of the parts of the assembly are as described above so that the description of the parts is not repeated. In the depicted embodiment, three connectors 16 are coupled to the housing 14, by integrally molding the connectors with the housing, by threaded fasteners, melting, adhesives, snap fits, interference fits into recesses, or other fastening techniques, and these fastening techniques may be used with any of the connectors 16 (e.g., 116, 216) described herein. One or more of the connectors 16 may have a keying device 52 with mating key parts such as projection 54 on one of the base or connector and the other of the key parts such as a mating recess 56 on the other of the base or connector, so that the projection and recess cooperate to position the housing 14 in a desired vertical orientation relative to the housing 12.

In the depicted embodiment three connectors 16 are located around the periphery of the bottom of the housing 14, spaced about 120° apart, with each connector 16 having a length that extends between the housing 14 and the form 22 or plate 21 so as to support the housing on the form or plate. The number of connectors can vary but is preferably few in number, with three connectors 16 preferred. One or more of the connectors 16 may fit into a mating recess on the base or plate 21 so as to orientate the housing relative to the base. The length of each connector 16 is adjusted to position the housing 14 and its cap 72 at the desired height relative to the plate 21 or the feet 18 so the housing is at a predetermined height relative to the concrete slab 23. The height adjustment may be at the time of manufacture or in the field when the device is used. When the base 12 is fastened to a plate 21, the connectors 16 may also optionally be fastened to the plate, as by adhesives, threaded fasteners to provide a fixed height housing, or the connectors may simply abut the plate 21 or not be permanently fastened so as to allow adjustment of the height in the field. Thus, when the plate 21 is used the base 12 may be fastened to the plate 21 with the connector(s) 16 allowing removal of the housing 14 to make it easier to insert the tube 32 through the opening in the bottom of the housing. The length of the connector(s) 16 and/or the housing 12 may be precut to place the housing and its cap 72 at a desired distance from the bottom of the plate 21. Thus, for example, for a six-inch-thick slab of concrete 23 the distance between the bottom of plate 21 and the top of the housing 14 (any cap 72 that extends above the top of the housing), is six inches or slightly less, with the base 12, housing 14, connector 16, cap 72 being precut or preformed to achieve that predetermined height when assembled. When the plate 21 is omitted, the parts are selected and preformed or precut so the height omits the thickness of the plate if the base and housing are made to a predetermined height, or the connectors 16 allow adjustment of the height in the field.

Referring to FIGS. 33A-33E, optionally, if the base 12, 112, 212 places the housing and cap in a desired height so no vertical adjustment is needed, then the positioning stops 134, 234 and connectors 16, 116 and 216 may be omitted. One or more releasable connectors 147 may depend from or be connected to the bottom of the housing 114. Each connector 147 preferably has two opposing, preferably curved, retaining arms 149a, 149b that depend from the bottom of the housing 114. The paired retaining arms 149a, 149b, form partial grooves located and configured to receive resilient arms 132 of the base 112 with the opening between the retaining arms 149a, 149b sized to snap-fit the retaining arms onto the mating portions (arms 132) of the base and releasably connect the housing 114 to the mounting arms 123 and base 112. The connectors 147 and its retaining arms 149a, 149b correspond to the connector 116 but are located parallel to the bottom of the housing 114 instead of perpendicular to the housing. The retaining arms 149a, 149b extend along two different lines that are inclined to each other in the same plane which is parallel to the bottom of the housing so as to restrain rotation and movement of the housing 114 relative to three orthogonal axes.

More than two retaining arms 147 may optionally be used to connect the housing to the base. Preferably, the housing 114 and retaining arms 149a, or connector 116, are integrally molded as a single part using a single pour of material, such as plastic. The connectors 147 may be used with the upper conduit supports 230 or with arms added to the base 212. The connectors 147 may be used with the base 12 if suitable portions of the base are configured to form a snap-fit connection with the connectors 147.

Figure 34:
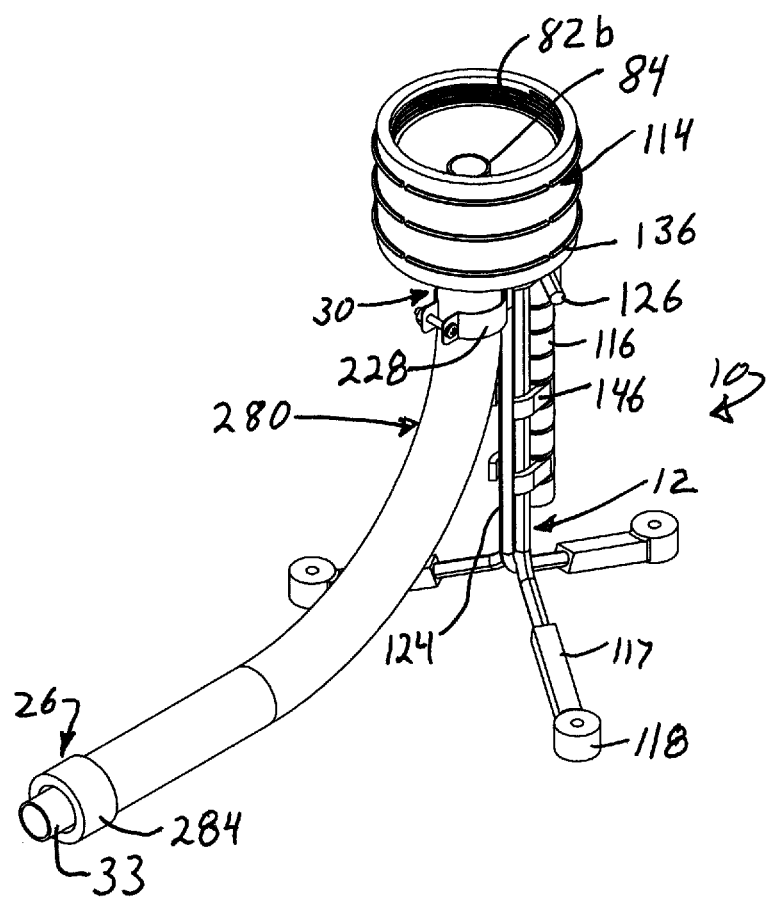
FIG. 34 is a perspective view of a bracket, housing and connector along with a curved support tube.

Referring to FIG. 34, a further bracket 10 is shown having a base 12 similar to that of FIGS. 14-19 but with a tube support 228 that comprises an adjustable connector (FIGS. 22-23) that takes the form of a clamp having two curved arms connected by a threaded fastener passing through a radial flange on the end of each arm in order to clamp a conduit 280. Except for the adjustable connector 228 and conduit 280, the bracket 10, base 12 and housing 14 are the same as in FIGS. 14-16 and 22-23 and the description of common parts is not repeated.

FIG. 34 shows conduit 280 as curved through a 90° curve or arc, with inlet end 26 adjacent the form 22 and outlet end 30 passing through the opening in the bottom of housing 14 so as to terminate inside the housing in a generally vertical orientation, with the inner elongated. The conduit 280 preferably comprises a rigid tube of plastic, polymer or metal that, once placed, does not deform when concrete is poured over it. Preferably, conduit 280 is not easily manually bent and preferably breaks or kinks if straightened manually from a 90° bend, or bent manually from a straight position to a 90° bend—without using a curved bending guide during the bending. A thin, uniformly curved metal pipe is preferred for conduit 280.

A coupling 284 is preferably provided on each opposing end of conduit 280. The coupling 284 may comprise a glue socket to allow adhesive coupling of the conduit 280 to another conduit, but threaded couplings or other connectors are also suitable. Because the conduit 280 maintains its shape, the bracket 10 merely positions the conduit 280 relative to housing 14 while the base 12 keeps the conduit 280 from falling sideways. The conduit 280 is preferably large enough in diameter to allow the inner elongated member or members 33 to pass through the conduit 280. In this embodiment, the connector 228 connects the conduit 280 to the base 12 in order to orientate the conduit 280 and connect it to the base 12. The conduit 280 then supports the inner elongated member 33 through the desired curvature formed by the conduit 228. The conduit 280 is preferably long enough that the inlet end 26 rests against the plate 21 or form 22 so as to support both ends of the conduit 280 vertically. Preferably, the conduit 280 is orientated to be within a plane passing through the body 124 of the base 12 and connector 116 as that is believed to provide a stable configuration. The conduit 228 preferably has a constant rate of curvature as it subtends an arc of 90° but the rate of curvature could vary.

The bracket and housing provide an improved method of supporting tubing or other conduit during the pouring of a concrete slab 23, which method is described regarding the embodiment of FIGS. 1-12 but which method is applicable to the other embodiments herein. The method may include connecting the tube 32 to the base 12 any time before the housing 14 is connected to the base. Advantageously, the tube 32 is passed through the opening in the bottom of the housing and then the housing 14 is connected to the base 12 and/or connector 16. Thus, the method may include inserting the tube 32 and preferably any tubes, wires or other contained members 33. into the base 12 and around the tube support formed by one or more of the ends 26, 30 and intermediate support 28 (whichever are present) before the base is fastened to the form 22 or before a base already fastened to a plate 21 is placed on a form 22. Before or after the tube 32 is connected to the base the tube is also passed through the hole in the bottom of the housing.

The method further includes fastening the bracket 10 to the form 22 or placing the base 12 and connected plate 21 on the form 22 which will help create one surface of the concrete slab 23. The form 22 typically comprises a flat sheet of plywood, a corrugated sheet of metal, dirt or gravel, or other surface on which the concrete slab is formed. The feet 18 are selected to be separated by a sufficient distance to provide a stable assembly for the bracket and housing. Optionally, where form 22 comprises a broken or penetrable surface such as soil, sand or gravel, bracket 10 may be secured in place by using building materials such as iron rebar, which can be driven into the surface comprising form 22 and fastened to any or all of base 12, housing 14 or connector 16 by screws, wire or plastic ties or other fasteners. The method further includes the optional step of adjusting the height of the base 12 and/or the length of connector 16 to position the top of the housing 14 and/or cap 72 at the desired location relative to the base 12 and at or slightly below the predicted exterior surface of the concrete slab 23. It is desirable to have the top of the housing and cap below the final concrete surface to avoid damage to the housing during concrete finishing. The top of the housing 14 is preferably positioned parallel to the predicted exterior surface of the concrete slab 23—which is usually horizontal but could be vertical or inclined.

The method preferably includes connecting the housing and base to orientate the housing relative to the base, but this may be done at the time of manufacture or in the field before pouring the concrete slab. The connector 16 may be connected to the housing 14, with an orientating mechanism such as the key mechanism 52 (or stops 134, 234 and arms 132, 230) and in order to orientate the housing relative to the base 12. The housing 14 is then connected to the connector 16 and base 12.

If the tube 32 passing through the opening in the bottom of the housing 14 does not substantially block that opening to help prevent the entry of concrete, or if a thin mix of concrete is planned for use, then the bottom opening in the housing may be further blocked as by duct tape or by providing a flexible material 75 (FIG. 9A) to cover part or all of the opening in the bottom of the housing. The method may also thus include closing or blocking the bottom opening in the housing enough to prevent concrete from filling the inside of the housing. As seen in FIG. 9A, a sheet of flexible plastic may cover the opening in the bottom of the housing, with the plastic being slit along diametrical lines to form inwardly extending triangular tabs 75 mounted around the outer periphery and flexing to allow passage of the tube 32 but which resist the entry of wet concrete into the housing 14. While the depicted tabs 75 are triangular in shape, other shapes can be used. For example, the tabs 75 may comprise a plurality of elongated fingers extending inward from the periphery of the opening in the bottom of the housing, which fingers have various shapes, including overlapping rectangular shapes and overlapping curved shapes.

The method may include optional securing steps. The housing 14 may optionally be secured to the base 12, as by threaded fasteners or other interconnections between the housing and base such as wires or cable ties binding the notches 56 in connector 16 to the base 12. Other connections are described later but are applicable to the previously described embodiments. The tube 32 and any internal tubes, conduits or elongated flexible members 33 are preferably cut off at a length selected to allow them to fit inside the housing 14 when the cap 72 is placed on the housing and the method preferably includes using those features, but members 33 may optionally be coiled, bunched or otherwise shaped to allow a surplus length to be contained within the housing 14 when the cap 72 is attached.

The method may include releasably closing the top of the housing with a cap. The cap 72 is releasably connected to the housing 14, preferably by threads 82. The cap 72 preferably has locating whiskers 78 extending away from the cap, preferably perpendicular to the plane of the cap 72 so the whiskers extend above the surface of the finished concrete to identify the location of the cap and housing in the finished slab. There is thus provided a method for locating a housing at the surface of a poured slab of concrete so the tube terminates inside the housing and is contained inside in the housing during pouring and finishing of the concrete slab, with the tube optionally stored in a curved or coiled configuration during pouring of the concrete.

The method may include concrete pouring and finishing steps. After the concrete slab 23 is poured the slab is finished, usually by a bull float step and later by troweling and likely power troweling steps. Advantageously the top surface of the housing and cap are flush with or slightly below the concrete surface so the whiskers 78 extend above the surface and flex with the various finishing steps to avoid cutting or detachment. The embedded cap, housing, base and connector are sufficiently strong to support a worker stepping on the bracket 10 and housing 14 during concrete finishing, and sufficiently strong to support the weight of the power trowel.

The method may include accessing the housing after the concrete hardens. When the concrete slab 23 is hardened, the whiskers identify the location of the housing and cap. Any thin layer of concrete covering the cap is removed, as needed. Tools, such as opposing jaws of channel grips or screwdrivers are placed into wrenching recesses 76 as needed in order to unscrew or otherwise remove the cap 72. The ends of the tube 32 and other tubes, wires, elongated members 33, etc. are then accessible for further use or connection. Advantageously, the housing 14 provides sufficient volume to contain enough undamaged tube and elongated members 33 (e.g., tubes, wires, cables) to allow a coupling 84 (FIG. 1) or other connection with the tube or other elongated members 33 or other devices to be formed inside or near to the housing, after the concrete is poured.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The above description is given by way of example, and not limitation. Given the above disclosure, one skilled in the art could devise variations that are within the scope and spirit of the invention. Further, the various features of this invention can be used alone, or in varying combinations with each other and are not intended to be limited to the specific combination described herein.

What is claimed is:

1. A bracket for holding at least one tube having a cross-sectional diameter D while being embedded in a concrete slab having a planned thickness T with a top surface and an opposing bottom surface, comprising:
    a base having a height and feet connected to the base to support the bracket in an upright orientation during use;
    a housing connected to the base, the housing being cylindrical shaped and defining a longitudinal axis, the housing having a bottom wall orthogonal to the longitudinal axis, the housing having at least one opening in the bottom wall of the housing which opening is large enough to allow the at least one tube to enter the housing through the opening in the bottom wall of the housing, the at least one opening being laterally offset from the longitudinal axis along which the housing extends;
    an elongated connector extending between and releasably connected to one of the base and the housing, the elongated connector has a top portion configured to be connected to the housing;
    a first tube support connected to the base and having a curved surface that is offset a distance below the opening in the bottom wall of the housing and located between the housing and the front end of the base so that during use the tube can bend around the first tube support and pass through the opening in the bottom wall of the housing, the first tube support having a front end closer to the bottom surface of the slab than the bottom wall of the housing during use; and a removable cap for a top of the housing covering an open top of the housing, the housing having an interior height of 0.7 to 3 inches, the housing, base and cap when assembled for use having a first height.

2. The bracket of claim 1, wherein further comprising a second tube support connected to the base and offset a distance below the first tube support to further define a radius of curvature of the tube during use, the first and second tube supports being offset a different lateral distance from a vertical axis through the opening in the bottom wall of the housing.

3. The bracket of claim 2, wherein the second support comprises a concave curved surface when viewed from a housing side of the bracket.

4. The bracket of claim 2, wherein the first and second supports each comprise a loop forming an opening larger in diameter than D.

5. The bracket of claim 2, wherein the base comprises a wire frame with three legs.

6. The bracket of claim 1, wherein the first tube support comprises two tube supports adjacent each other in the same plane which is parallel to a top of the housing and each configured to at least partially encircle a different tube connected to the base, and wherein the at least one opening in the bottom wall of the housing comprises a single opening configured so both tubes can enter that single opening.

7. The bracket of claim 1, wherein the first tube support comprises a concave curved surface when viewed from a housing side of the bracket.

8. The bracket of claim 1, wherein the first tube support comprises two tube supports adjacent each other in the same plane which is parallel to a top of the housing and each configured to at least partially encircle a different tube connected to the base, and wherein the at least one opening in the housing comprises a separate opening for each tube.

9. The bracket of claim 1, wherein the first support forms a curved surface extending through an arc of about 90° to avoid kinking of the tube during use.

10. The bracket of claim 1, wherein the first support comprises a loop forming an opening larger in diameter than D.

11. The bracket of claim 1, wherein the base comprises a wire frame with three legs.

12. The bracket of claim 1, wherein the housing is not removably connected to the base.

13. The bracket of claim 1, wherein the housing is removably connected to the base.

14. The bracket of claim 1, wherein the opening in the bottom wall of the housing is at least partially covered by flexible material extending across a portion of the opening in the bottom wall of the housing.

15. The bracket of claim 1, wherein the first tube support comprises a curved flexible tube extending over an arc of about 60° to about 90°.

16. The bracket of claim 1, wherein the first tube support comprises a curved rigid tube extending over an arc of about 60° to about 90°.

17. The bracket of claim 1, wherein the base includes a rectangular plate to which the at least three feet are fastened.

18. A bracket for embedding a conduit in a concrete slab that has an exterior surface and an opposing bottom surface defining a thickness of the concrete, comprising:
a base having a bottom with a plurality of feet each of which has at least one fastener opening large enough to allow a shaft of a fastener to pass, the base having a top opposite the bottom and a tube support having an inlet end by the bottom of the base and an outlet end by the top of the base, the tube support having a further intermediary support between the top and bottom of the base so a tube abutting the inlet end and abutting the intermediate support curves through an angle of 60° to 90° to avoid kinking of the conduit during use;
a housing having a sidewall, a top with a top opening therein and a bottom wall with a bottom opening therein, the bottom opening being larger than a cross-sectional diameter of the tube, the housing connected to the base, the bottom wall of the housing extending inward from the sidewall around at least a portion of the sidewall;
a removable cap configured to cover the top opening of the housing, the cap having a top surface and an opposing bottom surface, the housing and cap enclosing a space between the bottom surface of the cap and the bottom opening, the space having a height of 0.7 inches to 3 inches; and
an elongated connector extending between and releasably connected to one of the base and the housing.

19. The bracket of claim 18, wherein first and second mating surfaces on the elongated connector engage corresponding third and fourth surfaces on the base to restrain rotation of the elongated connector relative to the base.

20. The bracket of claim 19, wherein the elongated connector has a plurality of weakened sections at which the elongated connector may be broken to adjust the length of the elongated connector.

21. The bracket of claim 19, wherein the tube support extends from the inlet end to the outlet end and the intermediate support is curved about at least one axis.

22. The bracket of claim 19, wherein the tube support extends from the inlet end to the outlet end and the intermediate support is curved to encircle at least a portion of a cross-sectional diameter of the tube during use.

23. The bracket of claim 19, wherein the opening in the bottom wall of the housing is smaller in area than the opening in the top of the housing.

24. The bracket of claim 19, wherein the cap threadingly engages the housing.

25. The bracket of claim 19, wherein the inlet end is parallel to the bottom wall of the housing.

26. The bracket of claim 19, wherein the inlet end is downwardly inclined relative to the bottom wall of the housing.

27. The bracket of claim 19, wherein the outlet end extends along an axis perpendicular to the bottom wall of the housing.

28. The bracket of claim 19, wherein the base has three feet spaced apart from each other.

29. The bracket of claim 19, wherein the sidewall is generally cylindrical.

30. The bracket of claim 19, wherein the cap has at least one whisker extending outward at least an inch from the top surface of the cap.

31. The bracket of claim 19, wherein the intermediate support comprises a clamp.

32. The bracket of claim 19, wherein the top end and intermediate support each comprises a rod bent in a horizontal, circular shape.

33. The bracket of claim 19, wherein the tube support comprises a curved flexible tube.

34. The bracket of claim 19, wherein the tube support comprises a curved rigid tube.

35. The bracket of claim 18, wherein the housing has resilient clips that releasably engage an outer surface of the elongated connector to releasably engage the elongated connector.

36. The bracket of claim 18, wherein the base includes a rectangular plate to which at least some of the plurality of feet are fastened.

37. The bracket of claim 18, wherein the bottom opening is centered about an opening axis that is and a parallel to the height and offset from a central longitudinal axis of the housing around which the sidewall extends and a parallel to the height.

38. The bracket of claim 18, wherein a flange encircles a portion of the bottom opening and extends into the housing.

39. A bracket having a height for embedding a curved flexible tube in a concrete slab that has a slab thickness between a bottom surface and an exterior surface corresponding to the height of the bracket, comprising:
- a base having three feet spaced apart from each other with a bottom of each foot in substantially the same plane, each foot either having a fastener or having an opening for passage of a fastener;
- at least one curved tube support connected to the base;
- a housing connected to the base, the housing having a sidewall, a top with a top opening therein located above the base, the housing having a bottom wall with a bottom opening therein which is large enough to allow the flexible tube to pass through the bottom opening, the bottom wall of the housing extending inward from the sidewall around at least a portion of the sidewall;
- an elongated connector extending between and releasably connected to one of the base and the housing, the elongated connector has a top end connected to the housing; and
- a removable cap covering the top opening of the housing, the housing and cap enclosing a space large enough to allow a coupler to be installed by a coupling tool when the coupler is being installed on an end of an elongated member passing through the inside of the flexible tube, the space not exceeding three inches in height and width, the bracket not including the elongated member or flexible tube, the bracket height including the top of the removable cap.

40. The bracket of claim 39, wherein first and second mating surfaces on the elongated connector engage corresponding third and fourth surfaces on the base to restrain rotation of the elongated connector relative to the base.

41. The bracket of claim 39, wherein the at least two tube supports each includes an intermediate support that is curved toward the plane in which the feet are located.

42. The bracket of claim 27, wherein the intermediate support is curved.

43. The bracket of claim 39, wherein the at least two tube supports each comprises an inlet end closer to the plane in which the feet are located, an outlet end closer to the bottom opening of the housing, and an intermediate support located between the inlet and outlet ends and located on the foot side of a straight line extending between the inlet and outlet ends.

44. The bracket of claim 39, wherein each tube support comprises a curved surface extending through an arc of about 90°.

45. The bracket of claim 39, wherein each intermediate support is curved to encircle at least a portion of a cross-sectional diameter of a different one of the flexible tubes during use.

46. The bracket of claim 39, wherein the at least two tube supports each includes an intermediate support that comprises at least one clamp.

47. The bracket of claim 34, wherein each tube support comprises a rigid tube through which the flexible tube passes.

48. The bracket of claim 34, wherein each tube support comprises a flexible tube through which the flexible tube passes.

49. The bracket of claim 39, wherein the at least one tube support includes an intermediate support that is curved toward the plane in which the three feet are located.

50. The bracket of claim 39, wherein the at least one tube support comprises an inlet end closer to the plane in which the feet are located, an outlet end closer to the bottom opening of the housing, and an intermediate support located between the inlet and outlet ends and located below a straight line extending between the inlet and outlet ends.

51. The bracket of claim 50, wherein the intermediate support is curved.

52. The bracket of claim 50, wherein the intermediate support is curved to encircle at least a portion of a cross-sectional diameter of a different one of the flexible tubes during use.

53. The bracket of claim 39, wherein the at least one tube support comprises a curved surface extending through an arc of 60° to 90° to avoid kinking of the tube during use.

54. The bracket of claim 39, wherein the at least one tube support includes an intermediate support that comprises at least one clamp.

55. The bracket of claim 39, wherein the at least one tube support comprises a rigid tube through which the flexible tube passes during use.

56. The bracket of claim 39, wherein each tube support comprises a flexible tube through which the flexible tube passes during use.

57. The bracket of claim 39, wherein the bottom opening is centered about an opening axis that is offset from a longitudinal axis of the housing around which the sidewall extends.

58. The bracket of claim 39, wherein a flange encircles a portion of the bottom opening and extends into the housing.

* * * * *